US008634663B2

(12) United States Patent
Lakus-Becker

(10) Patent No.: US 8,634,663 B2
(45) Date of Patent: Jan. 21, 2014

(54) DVC AS GENERIC FILE FORMAT FOR PLENOPTIC CAMERA

(75) Inventor: Axel Lakus-Becker, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 769 days.

(21) Appl. No.: 12/619,738

(22) Filed: Nov. 17, 2009

(65) Prior Publication Data
US 2010/0142839 A1    Jun. 10, 2010

(30) Foreign Application Priority Data

Nov. 19, 2008  (AU) ................................ 2008246243

(51) Int. Cl.
G06K 9/36 (2006.01)
H03M 7/00 (2006.01)
H04N 5/225 (2006.01)

(52) U.S. Cl.
USPC ............................ 382/232; 341/107; 348/340

(58) Field of Classification Search
USPC ............................ 382/232; 341/107; 348/340
See application file for complete search history.

(56) References Cited

U.S. PATENT DOCUMENTS

| 6,614,483 | B1* | 9/2003 | Lee et al. .................... 348/391.1 |
| 7,388,521 | B2* | 6/2008 | Lu et al. ........................... 341/51 |
| 7,436,332 | B2 | 10/2008 | Lakus-Becker ................. 341/59 |
| 7,742,521 | B2* | 6/2010 | Vitali et al. .............. 375/240.03 |
| 7,743,309 | B2* | 6/2010 | Li et al. .......................... 714/774 |
| 8,189,682 | B2* | 5/2012 | Yamasaki ................. 375/240.25 |
| 8,248,515 | B2* | 8/2012 | Ng et al. ........................ 348/343 |
| 2003/0058354 | A1* | 3/2003 | Parulski et al. ............ 348/231.6 |
| 2003/0179297 | A1* | 9/2003 | Parulski et al. ............ 348/207.2 |
| 2004/0157560 | A1* | 8/2004 | Yamasaki ..................... 455/63.1 |
| 2005/0275573 | A1* | 12/2005 | Raveendran .................. 341/120 |
| 2006/0045184 | A1* | 3/2006 | Vetro et al. ............... 375/240.16 |
| 2006/0197690 | A1* | 9/2006 | Liu et al. .......................... 341/87 |
| 2008/0055124 | A1 | 3/2008 | Lakus-Becker ................ 341/81 |
| 2008/0152215 | A1 | 6/2008 | Horie et al. .................... 382/154 |
| 2008/0291065 | A1* | 11/2008 | Lu et al. ........................ 341/107 |
| 2009/0074077 | A1 | 3/2009 | Lakus-Becker .......... 375/240.25 |
| 2009/0103606 | A1* | 4/2009 | Lu et al. .................... 375/240.02 |
| 2009/0147841 | A1* | 6/2009 | Chang et al. ............. 375/240.01 |
| 2009/0167922 | A1* | 7/2009 | Perlman et al. ................ 348/340 |
| 2010/0142811 | A1* | 6/2010 | Okamoto et al. ............. 382/166 |
| 2010/0271505 | A1* | 10/2010 | Zimmer et al. ............ 348/231.2 |
| 2010/0316137 | A1* | 12/2010 | Long et al. ............... 375/240.27 |
| 2011/0069189 | A1* | 3/2011 | Venkataraman et al. .. 348/218.1 |

FOREIGN PATENT DOCUMENTS

JP        2008124530 A    *  5/2008
WO    WO 2008056497 A1  *  5/2008

OTHER PUBLICATIONS

Distributed Video Coding, Bernd Girod et al, Proceedings of the IEEE, vol. 93, No. 1, Jan. 2005, pp. 71-83.*

(Continued)

Primary Examiner — Wenpeng Chen
(74) Attorney, Agent, or Firm — Fitzpatrick, Cella, Harper & Scinto

(57) ABSTRACT

A computer implemented method of storing pixel data corresponding to a pixel is disclosed. A first and a second set of pixel data is determined for the pixel. Parity bits for the first set of pixel data are generated, using error correction. An encoded version of the first set of pixel data including the parity bits is stored. An encoded version of the second set of pixel data is stored, using lossless data compression, for use in decoding the first set of pixel data.

24 Claims, 16 Drawing Sheets

(56) References Cited

OTHER PUBLICATIONS

"Bandwidth Efficient Error Resilience Scheme for Wavelet based Video Transmission," Zhuo Xue et al, 2008 IEEE International Symposium on Broadband Multimedia Systems and Broadcasting, 2008, pp. 1-6.*

"Codec-Independent Scalable Distributed Video Coding," Mourad Ouaret et al, IEEE International Conference on Image Processing, 2007. ICIP 2007. vol. 3, 2007, pp. III-9-III-12.*

"Wyner Ziv Codec Design for Surveillance System using Adaptive Puncturing Rate," Muhammad Asif et al, ISCCSP 2008, Malta, Mar. 12-14, 2008, pp. 1454-1459.*

"Improving Frame Interpolation With Spatial Motion Smoothing for Pixel Domain Distributed Video Coding," João Ascenso et al, 5th EURASIP Conference on Speech and Image Processing, Multimedia Communications and Services, Smolenice, Slovak Republic, Jul. 2005, 6 pages.*

Notice of Acceptance of Australian Patent Application No. 2008246243.

Ng, R., et al., "Light Field Photography with a Hand-held Plenoptic Camera", Stanford Tech Report CTSR, Stanford University, Feb. 2005.

Gehrig, N.; Dragotti, P.L., "Distributed compression of the plenoptic function," Image Processing, 2004. ICIP '04. 2004 International Conference on Image Processing (ICIP), vol. 1, No., pp. 529 to 532 vol. 1, Oct. 24-27, 2004, doi: 10.10.1109/ICIP.2004.1418807, and attached sheet entitled "Distributed Compression of the Plenoptic Function", Imperial College of London.

Ren Ng; Marc Levoy; Mathieu Bredif; Gene Duval; Mark Horowitz; Pat Hanrahan; "Light field photography with a hand-held plenoptic camera", Stanford Tech Report CTSR 2005-02.

* cited by examiner

DVC AS GENERIC FILE FORMAT FOR PLENOPTIC CAMERA

FIELD OF THE INVENTION

The present invention relates generally to video encoding and decoding and, in particular, to a method and apparatus for decoding pixel data.

BACKGROUND

Various products, such as digital cameras and digital video cameras, are used to capture images and video. These products contain an image sensing device, such as a charge coupled device (CCD), to capture light energy focussed on the image sensing device. The captured light energy, which is indicative of a scene, is then processed to form a digital image. Various formats are used to represent such digital images, or videos. Formats used to represent video include JPEG, JPEG-LS, JPEG2000, lossless JPEG2000, H.264, MPEG2 or MPEG4.

Motion JPEG, MPEG2, MPEG4 and H.264 are compression formats. Such compression formats offer high quality and improve the number of video frames/images that can be stored on a given media. However, a user of the JPEG, MPEG2, MPEG4 and H.264 compression formats has to make a number of irreversible decisions at the time of capturing image and video data. For instance, the user has to decide on brightness, colour scheme, resolution and image quality.

One format known as the RAW format ameliorates some of the disadvantages of the above compression formats by storing sensor raw data. As such, one red, green, or blue pixel value is stored for each pixel location of an image. The RAW file format allows the user to make decisions as to brightness, colour scheme, resolution and image quality at a post processing stage. To allow more video frames/images to be stored, the RAW format often compresses the sensor raw data, using lossless compression such as JPEG LS.

All of the formats described above require a much more complex encoder than corresponding decoder. A complex encoder requires complex encoding hardware. Complex encoding hardware is disadvantageous in terms of design cost, manufacturing cost and physical size of the encoding hardware. Complex encoding hardware also results in long encoding runtime, which in turn delays rate at which video frames can be captured while not overflowing a temporary buffer. Additionally, more complex encoding hardware has higher battery consumption. As battery life is essential for mobile devices, it is desirable that battery consumption of such mobile devices is minimized.

In recent times, some cameras often enable more user-flexibility during post to processing. For example, some cameras allow a user to decide on an image plane after an image/video frame is captured. Such new cameras capture image data and convert the image data, using sophisticated decoding, into a viewable image or video. Cameras which offer this extra user flexibility include cameras with coded apertures, plenoptic cameras, phase plate cameras, stereo cameras, multi-view systems, radial catadioptric imaging devices, lensless cameras, cameras including mirror arrays, random cameras and event based cameras.

SUMMARY

It is an object of the present invention to substantially overcome, or at least ameliorate, one or more disadvantages of existing arrangements.

According to one aspect of the present invention there is provided a computer implemented method of storing pixel data corresponding to a pixel, said method comprising the steps of:

determining a first and a second set of pixel data for the pixel;

generating parity bits for the first set of pixel data, using error correction;

storing an encoded version of the first set of pixel data including the parity bits; and storing an encoded version of said second set of pixel data, using lossless data compression, for use in decoding the first set of pixel data.

According to another aspect of the present invention there is provided an apparatus for storing pixel data corresponding to a pixel, said apparatus comprising:

means for determining a first and a second set of pixel data for the pixel;

means for generating parity bits for the first set of pixel data, using error correction;

means for storing an encoded version of the first set of pixel data including the parity bits; and means for storing an encoded version of said second set of pixel data, using lossless data compression, for use in decoding the first set of pixel data.

According to still another aspect of the present invention there is provided a system for storing pixel data corresponding to a pixel, said system comprising:

a memory for storing data and a computer program; and a processor coupled to said memory executing said computer program, said computer program comprising instructions for:

determining a first and a second set of pixel data for the pixel;

generating parity bits for the first set of pixel data, using error correction;

storing an encoded version of the first set of pixel data including the parity bits; and storing an encoded version of said second set of pixel data, using lossless data compression, for use in decoding the first set of pixel data.

According to still another aspect of the present invention there is provided a computer readable medium having recorded thereon a computer program for storing pixel data corresponding to a pixel, said program comprising:

code for determining a first and a second set of pixel data for the pixel;

code for generating parity bits for the first set of pixel data, using error correction;

code for storing an encoded version of the first set of pixel data including the parity bits; and code for storing an encoded version of said second set of pixel data, using lossless data compression, for use in decoding the first set of pixel data.

According to still another aspect of the present invention there is provided a computer implemented method of decoding pixel data corresponding to a pixel, said method comprising the steps of:

determining a first and a second set of pixel data for the pixel;

generating parity bits for the first set of pixel data, using error correction;

storing an encoded version of the first set of pixel data including the parity bits;

storing an encoded version of said second set of pixel data, using lossless data compression, for use in decoding the first set of pixel data; and decoding the first set of pixel data using the second set of pixel data and the parity bits.

According to still another aspect of the present invention there is provided an apparatus for decoding pixel data corresponding to a pixel, said apparatus comprising:

means for determining a first and a second set of pixel data for the pixel;

means for generating parity bits for the first set of pixel data, using error correction;

means for storing an encoded version of the first set of pixel data including the parity bits;

means for storing an encoded version of said second set of pixel data, using lossless data compression, for use in decoding the first set of pixel data; and means for decoding the first set of pixel data using the second set of pixel data and the parity bits.

According to still another aspect of the present invention there is provided an apparatus for decoding pixel data corresponding to a pixel, said apparatus comprising:

a memory for storing data and a computer program; and a processor coupled to said memory executing said computer program, said computer program comprising instructions for:

determining a first and a second set of pixel data for the pixel;

generating parity bits for the first set of pixel data, using error correction;

storing an encoded version of the first set of pixel data including the parity bits;

storing an encoded version of said second set of pixel data, using lossless data compression, for use in decoding the first set of pixel data; and decoding the first set of pixel data using the second set of pixel data and the parity bits.

According to still another aspect of the present invention there is provided a computer readable medium having recorded thereon a computer program for decoding pixel data corresponding to a pixel, said program comprising:

code for determining a first and a second set of pixel data for the pixel;

code for generating parity bits for the first set of pixel data, using error correction;

code for storing an encoded version of the first set of pixel data including the parity bits;

code for storing an encoded version of said second set of pixel data, using lossless data compression, for use in decoding the first set of pixel data; and code for decoding the first set of pixel data using the second set of pixel data and the parity bits.

According to still another aspect of the present invention there is provided a method of storing pixel values for a portion of an image captured using a plurality of sensor cells in a sensor cell array, the plurality of sensor cells being associated with at least one micro lens in a micro lens array and arranged to form a sensor cell sub-array to capture a single pixel value associated with an output image, the method comprising the steps of:

storing lossless bits as a lossless representation of pixels values from a first subset of the plurality of sensor cells;

generating parity bits for pixel values from a second subset of the plurality of sensor cells, wherein the second subset of sensor cells is unique to the first subset of sensor cells; and storing the generated parity bits for use during decoding with the lossless bits to generate an estimation of the pixel value associated with the output image.

Other aspects of the invention are also disclosed.

BRIEF DESCRIPTION OF THE DRAWINGS

One or more embodiments of the present invention will now be described with reference to the drawings, in which:

FIG. 12A shows an exemplary sub-array;

FIG. 12B shows an approximation of input pixel data output by the side generator module of FIG. 7;

DETAILED DESCRIPTION

Figure 1:
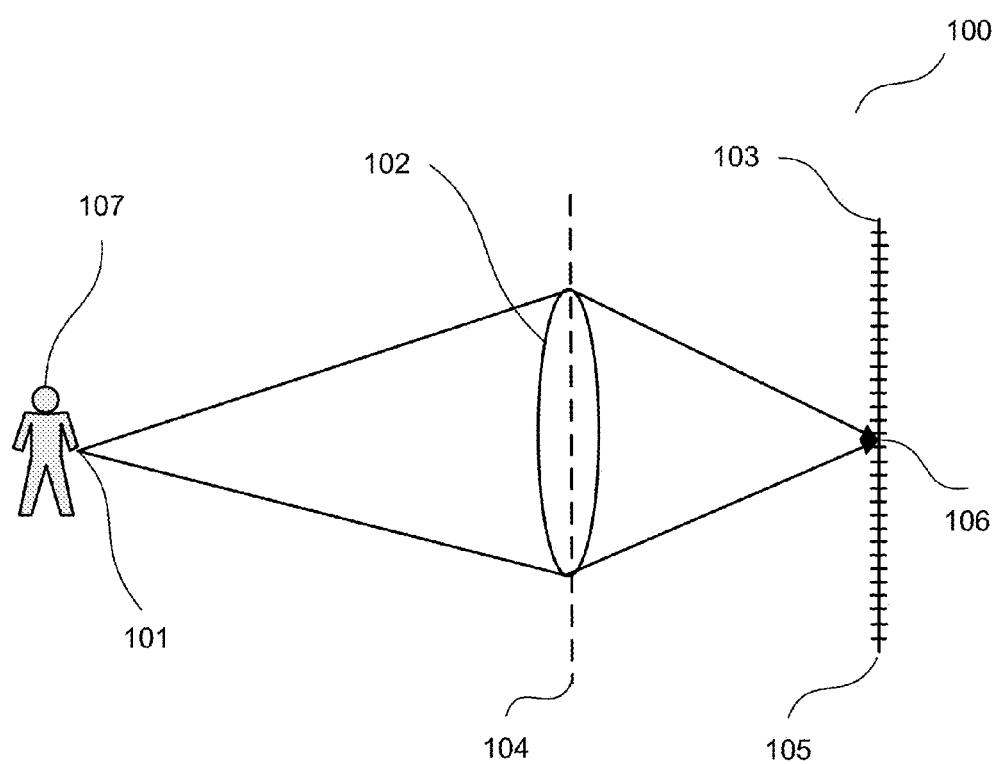
FIG. 1 is a schematic block diagram of an exemplary optical system for use in image and video data capture.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a schematic block diagram of an exemplary optical system 100 for use in image and video data capture. A point 101 of an object 107 is mapped by a lens 102 to a sensor cell array 105 which is positioned in an image plane 103. One sensor cell of the sensor cell array 105 corresponds to one picture element (i.e., pixel), which is denoted by 106.

In order to compensate for low fill factors of photodiodes, most sensor arrays use micro-lenses, which are small lenses deposited on a surface of each pixel in order to focus light on the photosensitive area of a sensor cell and to avoid diffraction of light to nearby sensor cells.

Figure 2:
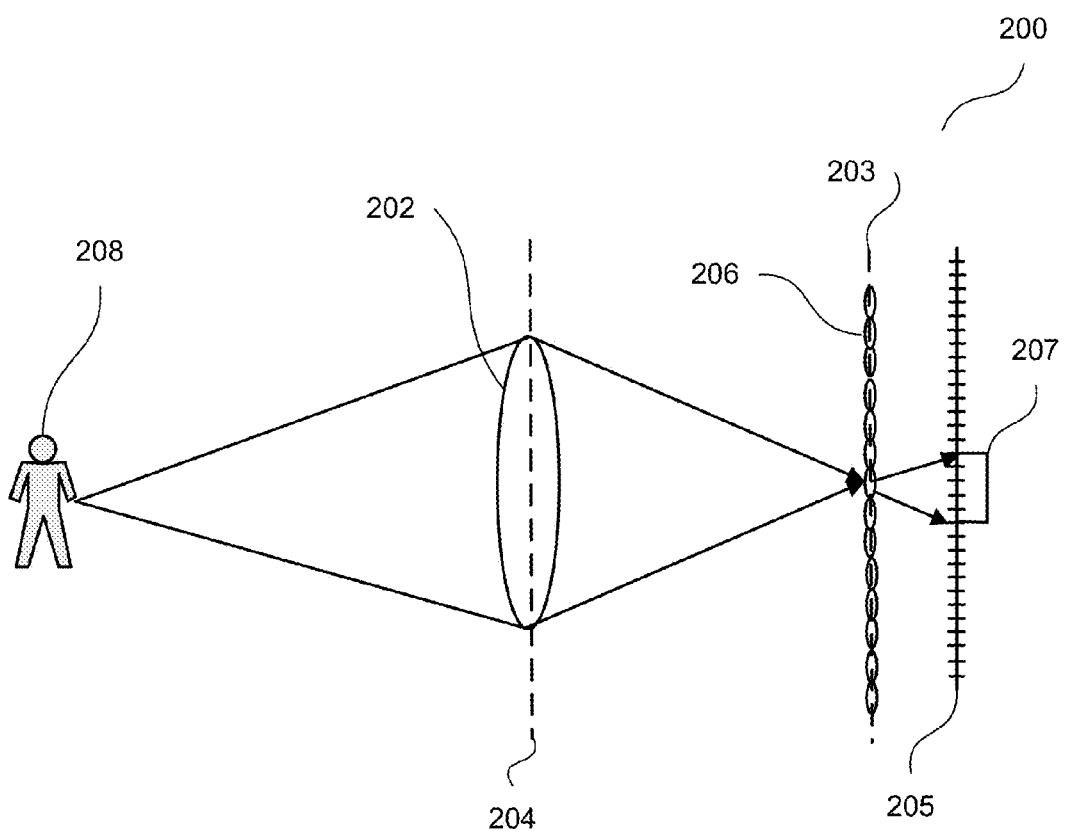
FIG. 2 is a schematic block diagram of an exemplary optical system for use in image and video data capture.

FIG. 2 shows a schematic block diagram of another optical image and video capture system 200. In the system 200, a micro-lens array 206 is positioned in an image plane 203. A sensor cell array 205 is positioned behind the image plane 203. In the system 200, light corresponding to one point 201 of an object 208 is captured by several sensor cells 207 of the array 205. The several sensor cells 207 may be referred to as a sub-array. Data related to the object point 201 is captured by the subarray 207.

In the system 200, resolution of a captured image of the object 208 is reduced. However, not only a two dimensional (2D) image of the object 208 is captured by the system 200 but a light field is captured revealing three dimensional (3D) information about the object 208. The system 200 comprising the micro-lens array 206 captures several images of the object 208 from slightly different viewing angles. Data captured using the system 200 allows an image to be synthesized. Further, field of depth of this synthesized image can be changed by changing the image synthesis.

The sensor cell arrays 105 and 205 are typically equipped with a colour filter array for arranging capture of only red, only green or only blue data values per one pixel cell.

Figure 3:
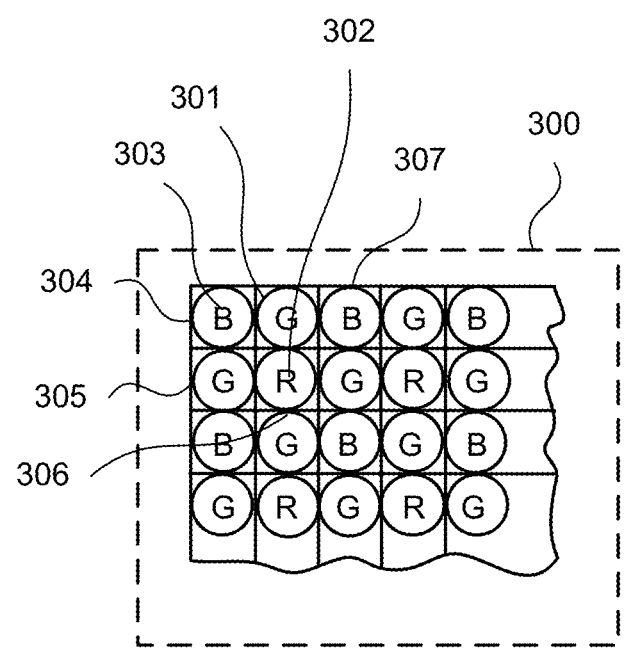
FIG. 3 shows an example portion of a Bayer mosaic colour filter array on a CCD cell array.

An example portion of a Bayer mosaic colour filter array 300 is shown in FIG. 3. The array 300 uses twice as many green picture elements (e.g., 301) as red (e.g., 302) or blue (e.g., 303) picture elements to obtain a more reliable sampling of luminance. To the human eye, green resembles luminance. Furthermore, FIG. 3 shows a "sphere of influence" 307 that one single object point has on sensor cells of the array 300. In the example of FIG. 3, the sensor cell array 300 is in an image plane (e.g., 103 or 203) and from each single object point only red, only green or only blue is sampled.

Figure 4:
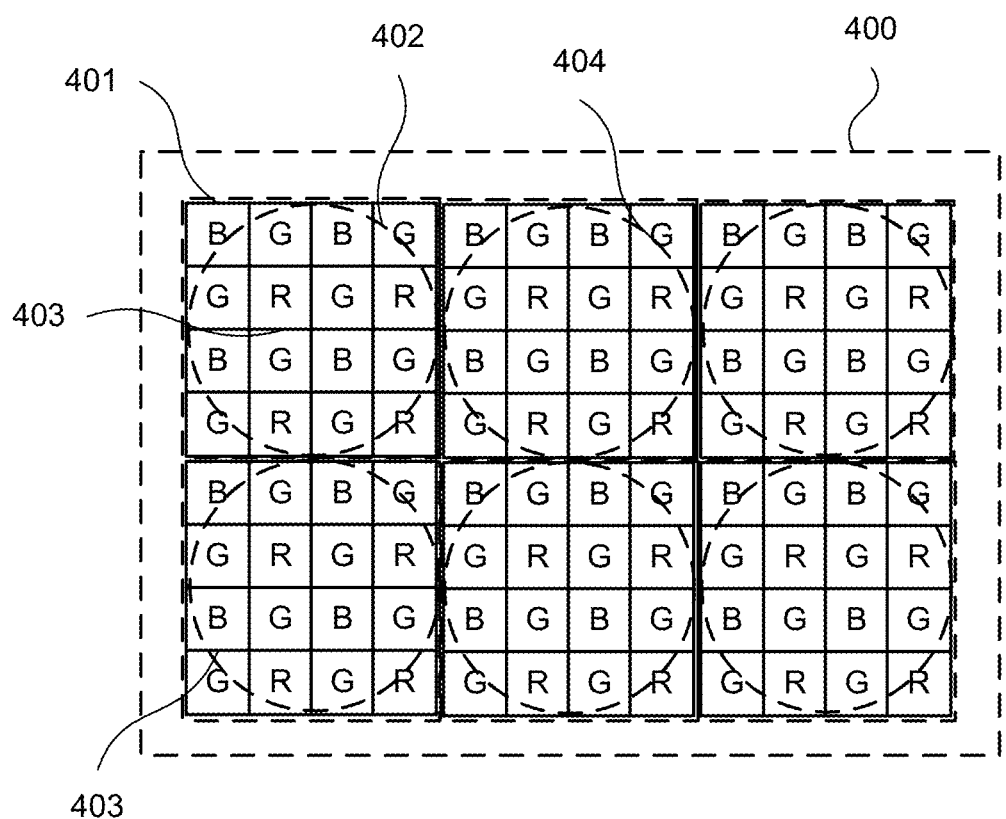
FIG. 4 shows sub-arrays formed on a sensor cell array.

FIG. 4 shows sub-arrays (e.g., 401) formed on a sensor cell array 400. Each sub-array 401 comprises a plurality of pixel cells (e.g., 403). The sub-array 401 of the sensor cell array 400 groups together a set of red, green, and blue pixel cells in a rectangular shape. Also shown in FIG. 4, is a "sphere of influence" 402 which is produced by a micro-lens (e.g., 206) sitting on the image plane 203 of FIG. 2. In the example of FIG. 4, the sphere of influence 402 covers most of the pixel cells (e.g., 403) belonging to the sub-array 401 without overlaying with any other spheres of influence (e.g., 402, 404, 405). Alternatively, any of the spheres of influence (e.g., 402, 404, 405) may overlap with each other.

Data captured by the sensor cell array 400 may be stored in a computer readable medium which will be described below. Typically, the data is also compressed before being stored. The data compression may be performed in a lossy or lossless manner using the JPEG, JPEG-LS, JPEG2000, lossless JPEG2000, H.264, MPEG2 or MPEG4 formats. The data compression may also be performed using the RAW file format, which usually incorporate lossless compression such as JPEG-LS. Synthesisation of images requires sample values of high accuracy.

Figure 7:
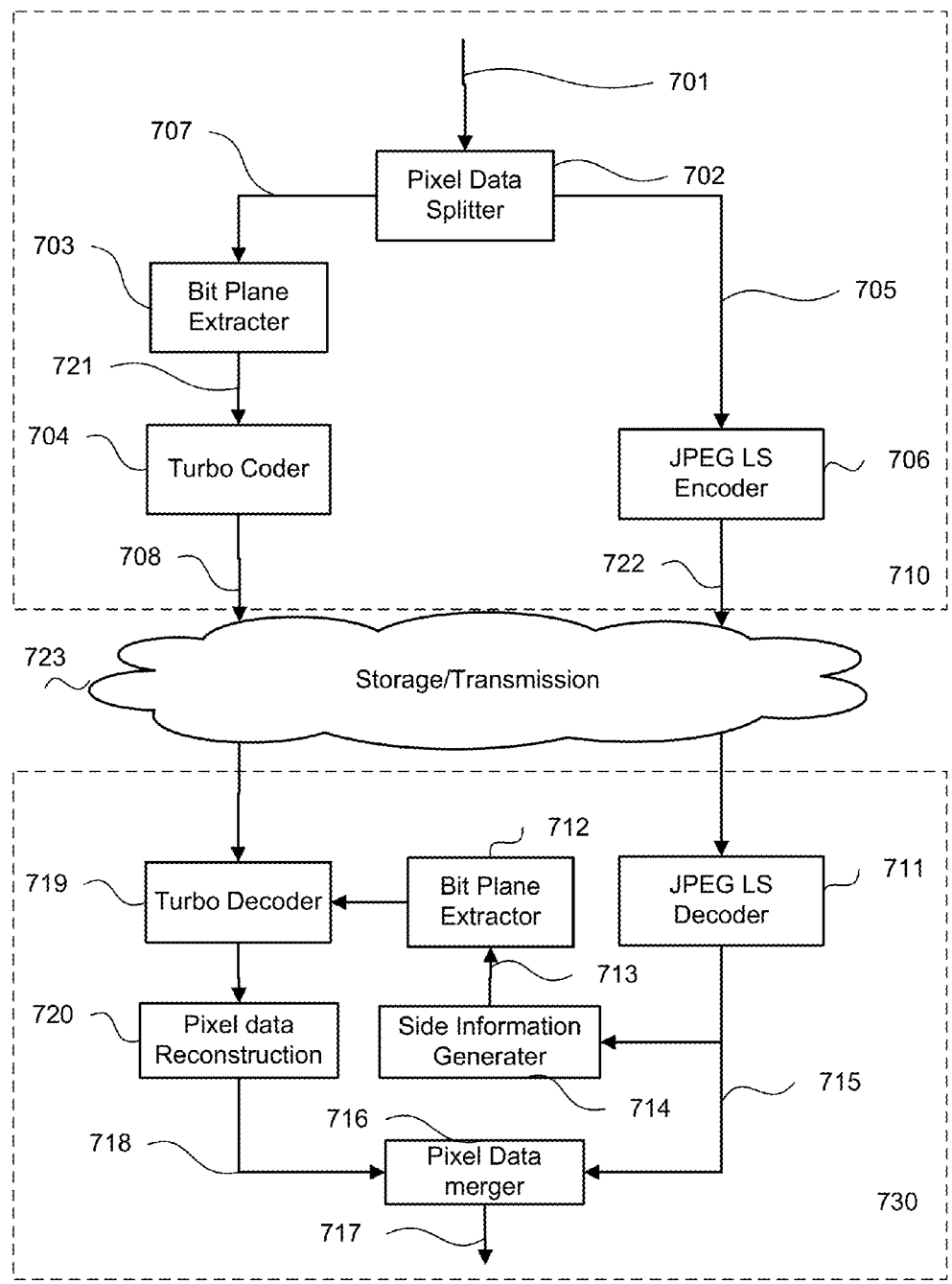
FIG. 7 shows a schematic block diagram of a system for encoding an input pixel data, for transmitting or storing the encoded pixel data, and for decoding the pixel data.

FIG. 7 shows one implementation of a system 700 for encoding input pixel data, for transmitting or storing the encoded pixel data and for decoding the pixel data. The system 700 includes an encoder 710 and a decoder 730 interconnected through a storage or transmission medium 723. The encoder 710 forms two independently encoded bit streams 708 and 722, which are jointly decoded by the decoder 730.

Figure 6A:
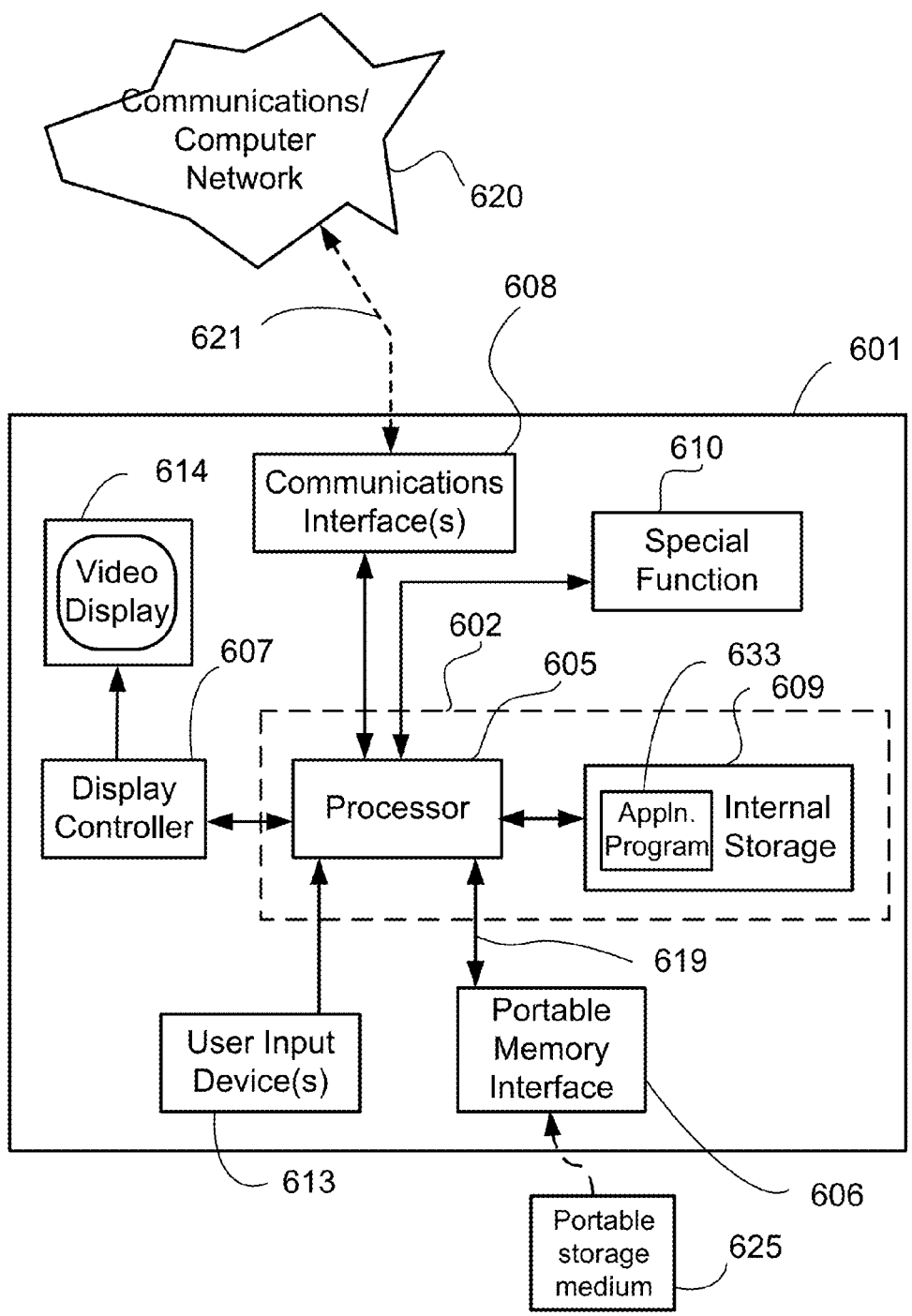
FIGS. 6A and 6B form a schematic block diagram representation of an electronic device upon which arrangements described may be practiced.
Figure 6B:
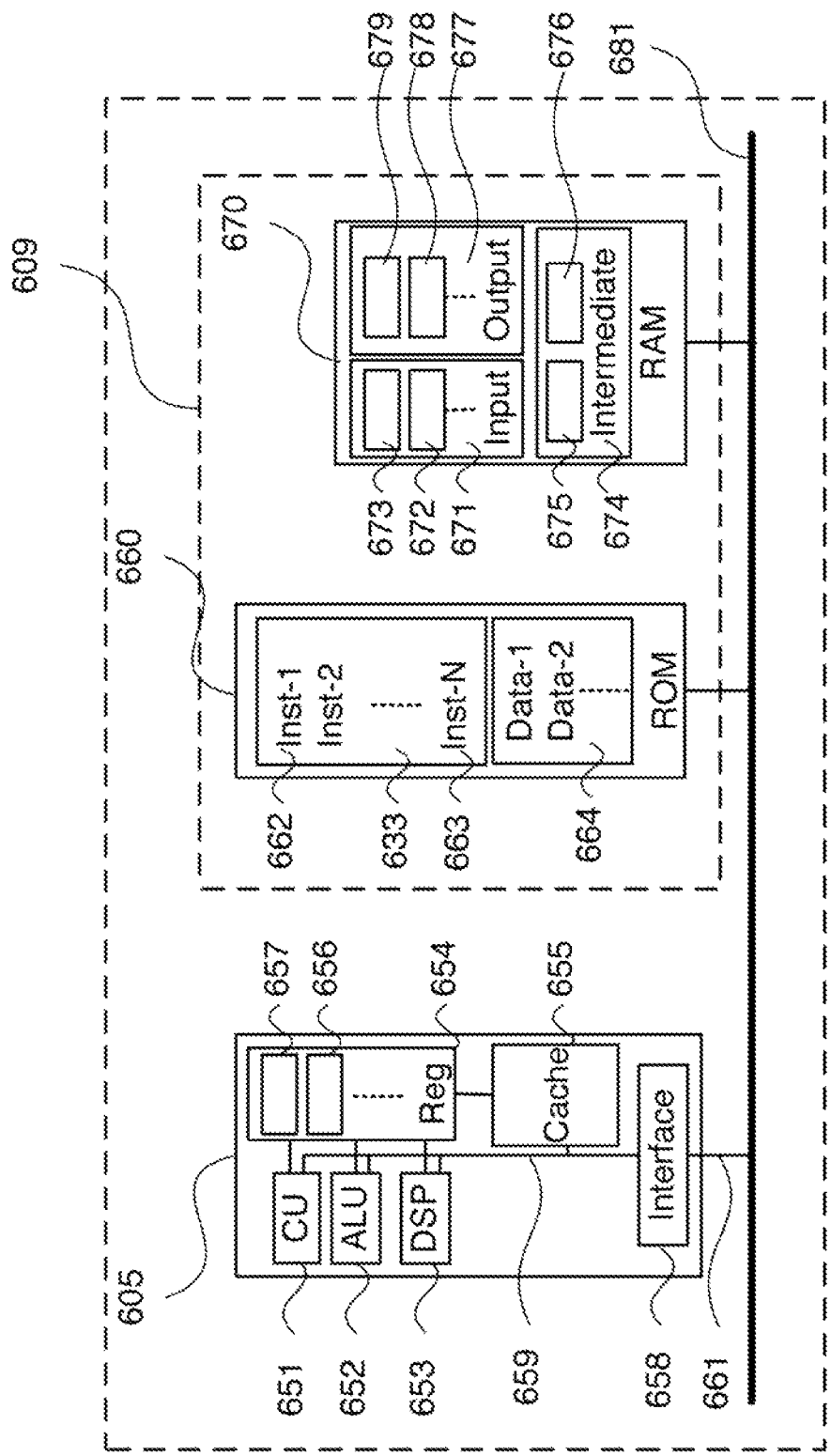

The components 710, 730 and 723 of the system 700 shown in FIG. 7 may be implemented using a general purpose electronic device 601 comprising embedded components such as the one shown in FIGS. 6A and 6B. The electronic device 601 may be, for example, a digital camera. Alternatively, the electronic device 601 may be a mobile phone or a portable media player, in which processing resources are limited. Nevertheless, the methods to be described may also be performed on higher-level devices such as desktop computers, server computers, and other such devices with significantly larger processing resources.

As seen in FIG. 6A, the electronic device 601 comprises an embedded controller 602. Accordingly, the electronic device 601 may be referred to as an "embedded device." In the present example, the controller 602 comprises a processing unit (or processor) 605 which is bi-directionally coupled to an internal storage module 609. The storage module 609 may be formed from non-volatile semiconductor read only memory (ROM) 660 and semiconductor random access memory (RAM) 670, as seen in FIG. 6B. The RAM 670 may be volatile, non-volatile or a combination of volatile and non-volatile memory.

The electronic device 601 comprises a display controller 607, which is connected to a video display 614, such as a liquid crystal display (LCD) panel or the like. The display controller 607 is configured for displaying graphical images on the video display 614 in accordance with instructions received from the processor 605.

The electronic device 601 also comprises user input devices 613 which are typically formed by keys, a keypad or like controls. In some implementations, the user input devices 613 may include a touch sensitive panel physically associated with the display 614 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 6A, the electronic device 601 also comprises a portable memory interface 606, which is coupled to the processor 605 via a connection 619. The portable memory interface 606 allows a complementary portable memory device 625 to be coupled to the electronic device 601 to act as a source or destination of data or to supplement the internal storage module 609. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 601 also comprises a communications interface 608 to permit coupling of the device 601 to a computer or communications network 620 via a connection 621. The connection 621 may be wired or wireless. For example, the connection 621 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 601 is configured to perform some special function. The embedded controller 602, possibly in conjunction with further special function components 610, is provided to perform that special function. In this embodiment, where the device 601 is a digital camera, the components 610 include a lens, a focus controller and image sensor of the camera.

The encoder 710 and decoder 730 may be implemented using the embedded controller 602 wherein the processes of FIGS. 1 to 5 and 7 to 15, to be described, may be implemented as one or more software application programs 633 executable within the embedded controller 602. The electronic device 601 is an effective and advantageous apparatus for implementing the described methods. In particular, with reference to FIG. 6B, the steps of the described methods are effected by instructions in the software 633 that are carried out within the controller 602. The software instructions may be formed as one or more software "code" modules, each for performing one or more particular tasks. The software may also be divided into two separate parts, in which a first part and the corresponding software modules (or software code modules)

performs the described methods and a second part and the corresponding software modules (or software code modules) manage a user interface between the first part and the user.

As described below, the encoder 710 comprises a plurality of software modules 702, 703, 704 and 706, each performing one or more specific method steps to be described below. Similarly, the decoder 730 comprises a plurality of other software modules 711, 712, 714, 716, 719 and 720, each performing one or more specific method steps to be described below. The steps of the methods described below may be implemented by instructions 631 in the software modules 702, 703, 704, 706, 711, 712, 714, 716, 719, and 720 which are executed within the device 601.

The software modules 702, 703, 704, 706, 711, 712, 714, 716, 719, and 720 are generally loaded into the controller 602 from a computer readable medium, and are then typically stored in the ROM 660 of the internal storage module 609, as illustrated in FIG. 6A, after which the software 633 can be executed by the processor 605. In some instances, the processor 605 may execute software instructions that are located in RAM 670. Software instructions may be located in RAM 670 by the processor 605 initiating a copy of one or more code modules from ROM 660 into RAM 670. Alternatively, the software modules 702, 703, 704, 706, 711, 712, 714, 716, 719, and 720 may be pre-installed in a non-volatile region of RAM 670 by a manufacturer. After one or more software modules have been located in RAM 670, the processor 605 may execute software instructions of the one or more code modules.

As described herein, the software modules 702, 703, 704, 706, 711, 712, 714, 716, 719, and 720 are typically pre-installed and stored in the ROM 660 by a manufacturer, prior to distribution of the electronic device 601. However, in some instances, the software modules 702, 703, 704, 706, 711, 712, 714, 716, 719, and 720 may be supplied to the user encoded on one or more CD-ROM (not shown) and read via the portable memory interface 606 prior to storage in the internal storage module 609 or in the portable memory 625. In another alternative, the software modules 702, 703, 704, 706, 711, 712, 714, 716, 719, and 720 may be read by the processor 605 from the network 620 or loaded into the controller 602 or the portable storage medium 625 from other computer readable media. Computer readable storage media refers to any storage medium that participates in providing instructions and/or data to the controller 602 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 601. Examples of computer readable transmission media that may also participate in the provision of software, application programs, instructions and/or data from computer readable storage media to the device 601 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 633 and the corresponding code modules mentioned above may be executed to implement one or more graphical user interfaces (GUIs) to be rendered or otherwise represented upon the display 614. Through manipulation of the user input device 613 (e.g., the keypad), a user of the device 601 and the application programs 633 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 6B is a detailed schematic block diagram of the controller 602 comprising the processor 605 for executing the application programs 633, and the internal storage 609. The internal storage 609 comprises read only memory (ROM) 660 and random access memory (RAM) 670. The processor 605 is able to execute the application programs 633 stored in one or both of the connected memories 660 and 670. When the electronic device 602 is initially powered up, a system program resident in the ROM 660 is executed. The application program 633 permanently stored in the ROM 660 is sometimes referred to as "firmware". Execution of the firmware by the processor 605 may fulfil various functions, including processor management, memory management, device management, storage management and user interface.

The processor 605 typically includes a number of functional modules including a control unit (CU) 651, an arithmetic logic unit (ALU) 652 and a local or internal memory comprising a set of registers 654 which typically contain atomic data elements 656, 657, along with internal buffer or cache memory 655. One or more internal buses 659 interconnect these functional modules. The processor 605 typically also has one or more interfaces 658 for communicating with external devices via system bus 681, using a connection 661.

The software modules 702, 703, 704, 706, 711, 712, 714, 716, 719, and 720 include a sequence of instructions 662 though 663 that may include conditional branch and loop instructions. The software modules 702, 703, 704, 706, 711, 712, 714, 716, 719, and 720 may also include data, which is used in execution of the program 633. This data may be stored as part of the instruction or in a separate location 664 within the ROM 660 or RAM 670.

In general, the processor 605 is given a set of instructions, which are executed therein. This set of instructions may be organised into blocks, which perform specific tasks or handle specific events that occur in the electronic device 601. Typically, the application program 633 will wait for events and subsequently execute the block of code associated with that event. Events may be triggered in response to input from a user, via the user input devices 613, as detected by the processor 605. Events may also be triggered in response to other sensors and interfaces in the electronic device 601.

The execution of a set of the instructions may require numeric variables to be read and modified. Such numeric variables are stored in the RAM 670. The disclosed method uses input variables 671 that are stored in known locations 672, 673 in the memory 670. The input variables are processed to produce output variables 677 that are stored in known locations 678, 679 in the memory 670. Intermediate variables 674 may be stored in additional memory locations in locations 675, 676 of the memory 670. Alternatively, some intermediate variables may only exist in the registers 654 of the processor 605.

The execution of a sequence of instructions is achieved in the processor 605 by repeated application of a fetch-execute cycle. The control unit 651 of the processor 605 maintains a register called the program counter, which contains the address in ROM 660 or RAM 670 of the next instruction to be executed. At the start of the fetch execute cycle, the contents of the memory address indexed by the program counter is loaded into the control unit 651. The instruction thus loaded controls the subsequent operation of the processor 605, causing for example, data to be loaded from ROM memory 660 into processor registers 654, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the software modules 702, 703, 704, 706, 711, 712, 714, 716, 719, and 720, and is performed by repeated execution of a fetch-execute cycle in the processor 605 or similar programmatic operation of other independent processor blocks in the electronic device 601.

In an alternative implementation of the system 700, only the encoder 710 is implemented within the device 601, wherein the modules 702, 703, 704 and 706 of the encoder 710 may be executed by the processor 605 of the device 601. Again, the encoder 710 may be implemented using hardware within the device 601.

Referring again to FIG. 7, pixel data 701 is received as input to system 700. The pixel data 701 may have been captured using the sensor cell array 105, where one sensor cell of the sensor cell array 105 corresponds to one picture element (i.e., pixel).

Alternatively, the pixel data 701 may have been captured using the sensor cell array 205, where light corresponding to one point 101 of the object 208 is captured by several sensor cells 207 of the array 205. A plurality of sensor cells 207 correspond to one picture element (i.e., pixel).

The pixel data splitter module 702, executed by the processor 605, splits the input pixel data 701 into a first set of pixel data ("set P") and a second set of pixel data ("set S"). The operation of the pixel data splitter module 702 will be described in greater detail below. The first set of pixel data and the second set of pixel data output by the pixel data splitter module 702 are denoted as P pixel set 707 and S pixel set 705, respectively, where P and S represent a number of pixels. The two pixel sets 707 and 705 are encoded differently and may be stored in the memory 606 and/or the storage device 609.

The S pixel set 705, output from the pixel data splitter module 702, is input to a JPEG LS encoder module 706 which performs lossless data compression on the S pixel set 705. The JPEG LS encoder module 702, executed by the processor 605, compresses the S pixel set 705 according to image content of the S pixel set 705. Flat regions are isolated for run-length encoding. Pixels belonging to non-flat regions are predicted for entropy encoding. The S pixel set 705 may be stored in the internal storage module 609. Accordingly, an encoded version or representation of the second set of pixel data (i.e., the S pixel set 705), is stored, using lossless data compression. The encoded version of the second set of pixel data may be used for decoding the P pixel set 707, as will be described to in detail below.

Compressed data bits output by the JPEG LS encoder module 706 form part of the encoded bit stream 722 which is transmitted over a storage or transmission medium 723. The operation of the JPEG LS encoder module 706 will be described in detail below with reference to FIG. 5.

The P pixel set 707 generated by the pixel data splitter module 702 is input to a bit plane extractor module 703. The bit plane extractor module 703 performs the step of forming a bit stream for the given P pixel set 707. In the implementation of FIG. 7, the bit plane extractor module 703 extracts every pixel in the P pixel set 707 output from the pixel data splitter module 702. Preferably, scanning starts on a most significant bit plane of the P pixel set 707 and the most significant bits of the pixels of the P pixel set 707 are concatenated to form a bit stream containing the most significant bits. The bit stream formed by the bit plane extractor module 703 may be stored in the internal storage module 609.

In a second pass, the bit plane extractor module 703 scans the P pixel set 707 and concatenates the second most significant bits of all pixels of the P pixel set 707. The bits from the second scanning pass are appended to the bit stream generated in the previous scanning pass and stored in the internal storage module 609. The scanning and appending continues in this manner until the least significant bit plane of the P pixel set 707 is completed to generate one bit stream 721 representing the input pixel data 701. The bit stream 721 is output from the bit plane extractor module 703 and may be stored in the internal storage module 609.

Alternatively, not every pixel of the P pixel set 707 is processed. In this instance, the bit plane extractor module 703 is configured to extract a specified subset of pixels within each bit plane to generate the bit stream 721. The bit stream 721 generated in this alternate manner contains bits for spatial resolutions lower than an original resolution.

The bit stream 721 output from the bit plane extractor module 703 is encoded in a turbo coder module 704 to produce the bit stream 708 containing parity information. The turbo coder module 704 performs the step of encoding the bit stream 721 after processing by the bit plane extractor 703 to generate parity bits from the bit stream 721 according to a bitwise error correction method. Accordingly, the turbo encoder module 704 generates parity bits for the first set of pixel data, using error correction. The parity bits may be used during subsequent decoding.

Parity bits are generated by the turbo coder module 704 for each bit plane of the P pixel set 707. For example, if the bit depth of the P pixel set 707 is eight, then eight sets of parity bits are generated by the turbo coder module 704 of which each parity bit set refers to one bit plane only. The parity bits output by the turbo coder module 704 are then transmitted over the storage or transmission medium 723 in the bit stream 708. The bit stream 708 represents an encoded version (or representation) of the P pixel set (i.e., the first set of pixel data). The bit stream 708 including the parity bits may also be stored in the internal storage module 609. Accordingly, an encoded version of the first set of pixel data, including the parity bits, is stored.

The operation of the turbo coder module 704 will be described in detail below with reference to FIG. 11.

The encoder 710 thus forms two bit streams 708 and 722 all derived from the same input pixel data 701. The bit streams 708 and 722 may be multiplexed into a single bit stream, which may then be stored in, or transmitted over the storage or transmission medium 723. The single bit stream may also be stored in the internal storage module 609.

Having described an overview of the operation of the encoder 710, an overview of the operation of the decoder 730 will now be described in detail below. The decoder 730 receives the bit stream 708 from the turbo coder module 704 and the bit stream 722 from the JPEG LS encoder module 706. The decoder 730 outputs a bit stream 717 which is a final approximation of the input pixel data 701.

In the implementation of FIG. 7, the bit stream 722 is processed by a JPEG LS decoder module 711 which performs the inverse operation to JPEG LS encoder module 706. The JPEG LS decoder module 711, executed by the processor 605, performs the step of decompressing and reconstructing a lossless version or representation of the S pixel set 705 to output a decoded S pixel set 715.

The decoded S pixel set 715 output from the JPEG LS decoder module 711 is input into a side information generator module 714. The side information generator module 714, executed by the processor 605, outputs pixel data 713 representing an approximation of the input pixel data 701, based on the decoded S pixel set 715. The pixel data 713 may be referred to as "side information"715. The generation of the side information 713 will be described in detail below with reference to FIGS. 12A and 12B. The side information 713 output from the side information generator module 714 is used for performing turbo decoding as will be described in detail below. The side information 713 may be stored in the internal storage module 609.

The side information 713 from the side information generator module 714 is input to a bit plane extractor module 712 which is substantially identical to the bit plane extractor module 703 of the encoder 710. The bit plane extractor module 712, executed by the processor 605, performs the step of forming a bit stream for the side information 713 output from the side information generator module 714. The bit stream output by the bit plane extractor module 712 may be buffered within the internal storage module 609 for later decoding.

The decoder 730 comprises a turbo decoder module 719, which is described in detail below with reference to FIG. 13. The turbo decoder module 719, executed by the processor 605, operates on each bit plane of the input bit stream 708 in turn to correct at least a portion of that (current) bit plane. In a first iteration, the turbo decoder module 719 receives parity bits for a first (most significant) bit plane of bit stream 708 as input. The turbo decoder module 719 also receives a first bit plane from the bit stream output from the bit plane extractor module 712 as side information bits. The turbo decoder module 719 uses the parity bits (or parity information) for the first bit plane to improve the approximation (or determine a better approximation) of the first bit plane of the approximated version of the P pixel set 707. The turbo decoder module 719 outputs a decoded bit stream representing a decoded first bit plane. The turbo decoder module 719 then uses the parity bits for each lower bit plane to determine decoded bit planes for each of the lower bit plane. Accordingly, the turbo decoder module 719, executed by the processor 605, performs the step of using the parity information to determine a decoded bit stream representing a better approximation of the P pixel set 707.

The decoded bit stream determined by the turbo decoder module 719 may be stored in the internal storage module 609. Accordingly, the turbo decoder module 719, executed by the processor 605, decodes the first set of pixel data (i.e., the P pixel set 707) using the second set of pixel data (i.e., the S pixel set 705) and the parity bits.

The decoder 730 further includes a pixel data reconstruction module 720. The pixel data reconstruction module 720, executed by the processor 605, performs the step of to determining pixel values for the decoded bit stream output by the turbo decoder module 719. The most significant bits of the pixel data of the P pixel set 707 are first determined by the pixel data reconstruction module 720. The second most significant bits of the pixel data of the P pixel set 707 are then determined and concatenated with the first most significant bits of the pixel data of the P pixel set 707. The pixel data reconstruction module 720 then determines bits for lower bit planes, in a similar manner, until all bits are determined for each bit plane of the P pixel set 707. Resulting pixel values output from the pixel data reconstruction module 720 form an output P pixel set 718 (where P represents a number of pixels), which is a final approximation (or estimation) of the input P pixel set 707. The output P pixel set 718 may be stored in the internal storage module 609.

The decoded S pixel set 715 output from the JPEG LS decoder module 711, and the decoded P pixel set 718 output from the pixel data reconstruction module 712 are merged in a pixel data merger module 716. The pixel data merger module 716 performs the inverse operation to the pixel data splitter module 702 in the encoder 710. The decoded S pixel set 715 and the decoded P pixel set 718 are put back into original spatial positions corresponding to the spatial positions of the input pixel data 701 on a sub-array basis, as will be described in detail below. The pixel data merger module 716 outputs reconstructed pixel data 717 which is a final approximation (or estimation) of the input pixel data 701.

Figure 8:
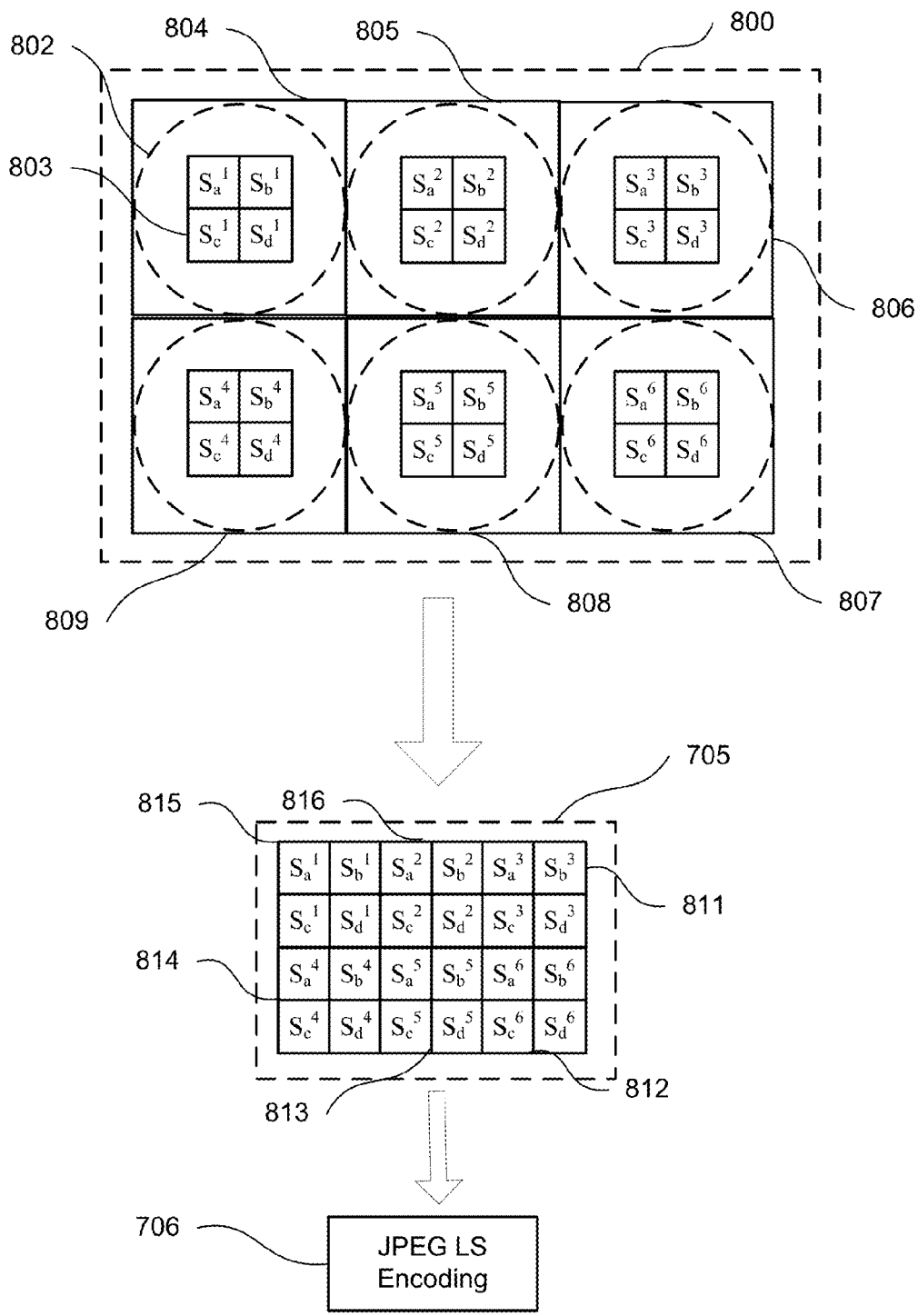
FIG. 8 shows an exemplary S pixel set.

Having described system 700 for encoding an input video to form two independently encoded bit streams, and jointly decoding the bit streams to provide output pixel data, components of the system 700 are now described in more detail, starting with pixel data splitter module 702. The pixel data splitter module 702 takes the input pixel data 701 as input and generates the S pixel set 722 and the P pixel set 707. The generation of the S pixel set 705 from the input pixel data 701 will now be described in detail with reference to FIG. 8. Preferably, the input pixel data 701 is captured by the CCD cell array 205 of FIG. 2. As described above, the CCD cell array 205 is located behind the image plane 203. The input pixel data 701 is captured in a frame by frame manner. FIG. 8 shows an example of such a pixel frame 800.

As seen in FIG. 8, pixels of a pixel frame 800 corresponding to the input pixel data 701 are divided into a group of square blocks 804, 805, 806, 807, 808, and 809. Each of the square blocks 804, 805, 806, 807, 808, and 809 may be referred to as a sub-array 804, 805, 806, 807, 808 and 809. FIG. 8 also shows "spheres of influence" (e.g., 802) produced by the micro-lens 206 located on the image plate 203 as seen in FIG. 2. The sphere of influence 802 is located inside the sub-array 804. Pixels located around the centre of a sphere of influence (e.g., 802) are referred to as central pixels. For instance, pixel 803, denoted $S_c^1$ is a central pixel of the sub-array 804.

In one implementation, each subset in the S pixel set 705 is associated with a unique sub-array in the pixel frame 800 according to a raster scan order. For example, pixel subset 815 (i.e., comprising pixels $S_a^1$, $S_b^1$, $S_c^1$ and $S_d^1$) is associated with the sub-array 804, pixel subset 816 (i.e., comprising pixels $S_a^2$, $S_b^2$, $S_c^2$ and $S_d^2$) is associated with sub-array 805, pixel subset 811 (i.e., comprising pixels $S_a^3$, $S_b^3$, $S_c^3$ and $S_d^3$) is associated with sub-array 806, and pixel subset 814 (i.e., comprising pixels $S_a^4$, $S_b^4$, $S_c^4$ and $S_d^4$) is associated with sub-array 809, and so on. Alternatively, pixel subsets in the S pixel set 705 may be associated with sub-arrays in the frame 800 in accordance with a vertical scan order. For example, the pixel subset 815 may be associated with the first sub-array 804, and the pixel subset 814 may be associated with the sub-array 805, and so on.

In one implementation, four central pixels from a sub-array are used to form pixels of a subset in the S pixel set 705. For example, the pixels $S_a^1$, $S_b^1$, $S_c^1$, and $S_d^1$ from the sub-array 804 are used to form the pixel subset 815; the pixels $S_a^2$, $S_b^2$, $S_c^2$, and $S_d^2$ from the sub-array 805 are used to form the pixel subset 816, and so on.

Preferably, the pixels in both a sub-array and an associated subset remain in a same spatial order. For example, the pixels $S_a^1$, $S_b^1$, $S_c^1$, and $S_d^1$ in subset 815 follow the same order as the pixels $S_a^1$, $S_b^1$, $S_c^1$, and $S_d^1$ in the sub-array 810 (i.e., $S_a^1$ to $S_b^1$ to $S_c^1$, to $S_d^1$ in a clock-wise fashion). However, in another implementation, the number of central pixels from each sub-array may be other than four. For example, the central pixels may comprise five pixels in a top-left-centre-right-bottom order.

Pixels in a subset may also form in an order different from the spatial order of central pixels in an associated sub-array. For example, the pixels in pixel subset 815 may follow an anti-clock wise order of $S_d^1$ to $S_c^1$ to $S_b^1$ to $S_a^1$, instead of a clock-wise order of $S_a^1$ to $S_b^1$ to $S_c^1$ to $S_d^1$ as shown in FIG. 8.

The S pixel set 705 generated as described above is input to the JPEG-LS encoder 706 which will be described in greater detail below.

The generation of the P pixel set 707 from the input pixel data 701 will now be described in detail with reference to FIG. 9. Preferably, the input pixel data 701 is captured by the CCD cell array 205. As described above, the CCD cell array 205 is located behind the image plane 203. The input pixel data is captured in a frame by frame manner.

Figure 9:
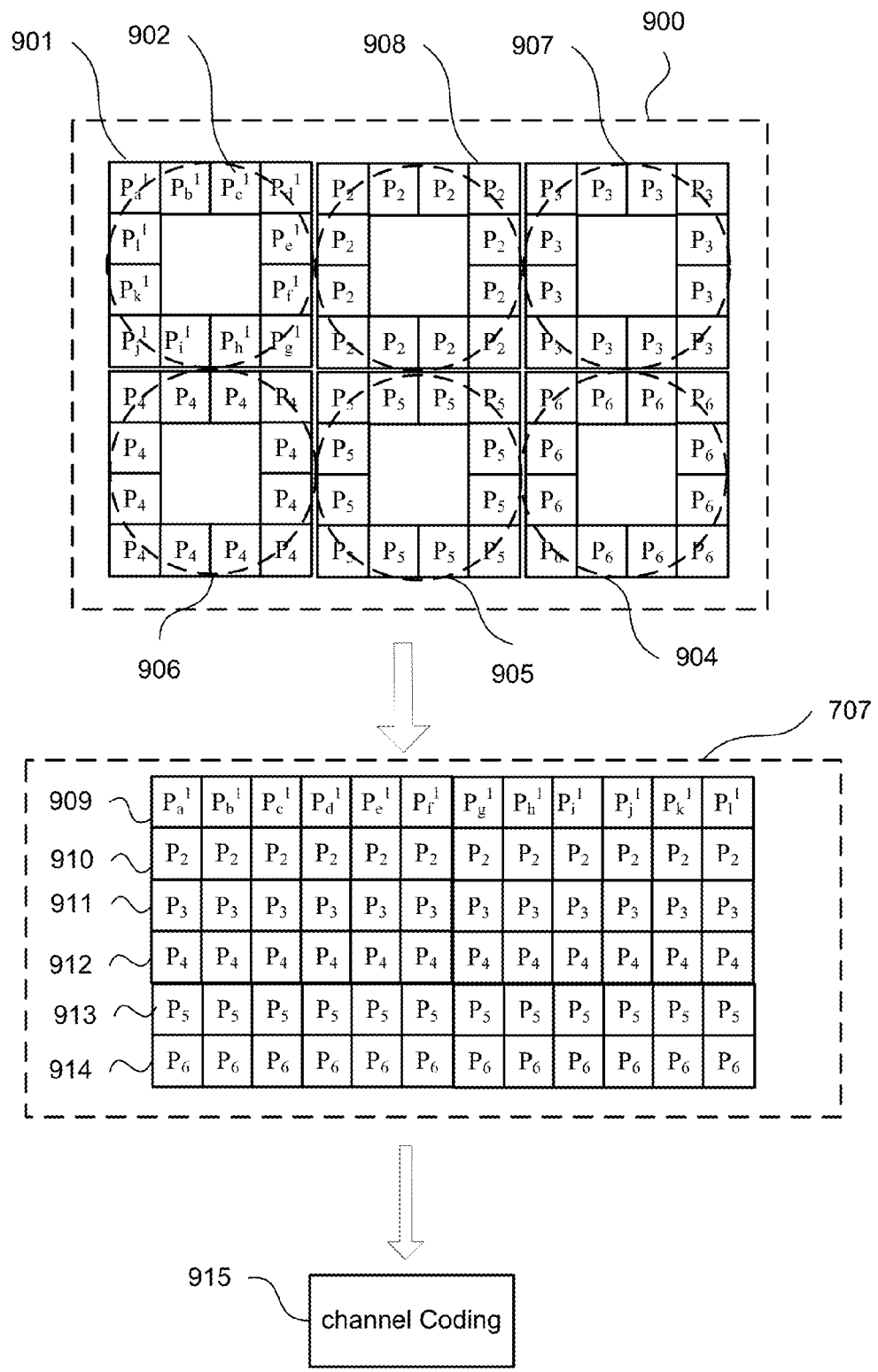
FIG. 9 shows an exemplary pixel set.

FIG. 9 shows one pixel frame 900 corresponding to the input pixel data 701. The pixel frame 900 is divided into a group of sub-arrays 901, 908, 907, 906, 905 and 904, and so on. Each sub-array 901, 908, 907, 906, 905 and 904 is associated with a sphere of influence. For example, one of the spheres of influence 902 is located inside the sub-array 901.

Pixels in sub-arrays that are not yet used to form the S pixel set (e.g., the S pixel set 810 corresponding to the S pixel set 705) are used to form P pixel set 707. The formulation of the P pixel set 707 is conducted in a pixel subset by pixel subset basis. Each subset in the P pixel set 707 is associated with a unique sub-array from the pixel frame 900 according to a raster scan order. For example, the pixel subset 909 (i.e., comprising pixels $P_a^1, P_b^1, P_c^1, P_d^1, P_e^1, P_f^1, P_g^1, P_h^1, P_i^1, P_j^1, P_k^1$, and $P_l^1$) is associated with the sub-array 901, the pixel subset 910 (i.e., comprising pixels $P_2$) is associated with the sub-array 908, the pixel subset 911 (i.e., comprising pixels $P_3$) is associated with the sub-array 907, and the pixel subset 906 (i.e., comprising pixels $P_4$) is associated with the sub-array 912, and so on. Alternatively, each subset in the P pixel set 707 is associated with a unique sub-array from the pixel frame 900 according to a vertical scan order. For example, the pixel subset 909 is associated with the first sub-array 901, and the pixel subset 910 is associated with the sub-array 906, and so on.

In one implementation, P pixels belonging to each sub-array are processed in a clock-wise order. For example, the pixels $P_a^1, P_b^1, \ldots, P_l^1$ are extracted from the sub-array 901 to form the subset 909, where the pixels $P_a^1, P_b^1, \ldots, P_l^1$ are positioned according to the alphabet order of their subscript (i.e., $[P_a^1, P_b^1, \ldots, P_l^1]$). Such a process is applied to the formulation of all subsets based on P pixels from their associated sub-arrays. In an alternative implementation, P pixels may be extracted from a sub-array in an anti-clock-wise order to form an associated subset in the P pixel set 707. For example, P pixels from the sub-array 901 can be used to form the subset 909 in a reverse alphabet order such as $[P_l^1, P_k^1, \ldots, P_a^1]$. In yet another implementation, pixels in a sub-array may be extracted in a raster scan order.

The P pixel set 707 generated by the pixel data splitter module 702 is passed to a channel encoding system 915 which corresponds to a combination of the bit plane extractor module 703 and the turbo coder 704 of FIG. 7.

Figure 5:
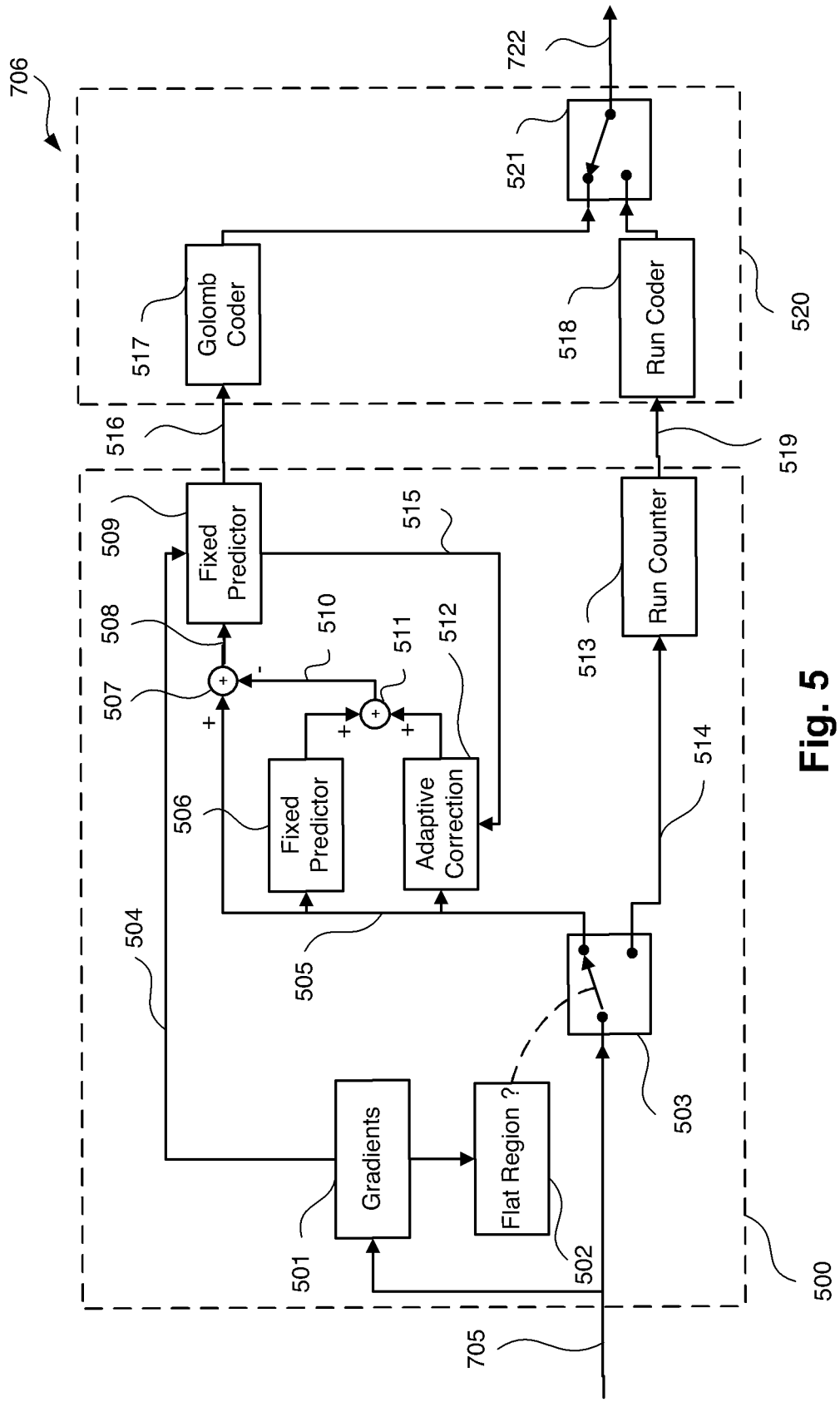
FIG. 5 shows a schematic functional of a JPEG-LS encoder.

The JPEG LS encoder module 706 will now be described in more detail. FIG. 5 is a schematic diagram showing the JPEG LS encoder module 706. The JPEG LS encoder module 706 comprises two main parts, namely a content modeller module 500 and an entropy encoder module 520. The modules 500 and 520 may be implemented as software resident in the internal storage module 609 and being controlled in their execution by the processor 605.

The content modeller module 500 processes the input pixel data 705 in the form of the S pixel set 705 to setup a proper content modelling. The modelling parameter generated by the content modeller module 500 is passed to an entropy encoder module 520 which produces the set of compressed data 722 accordingly for the S pixel set 705.

The functionality of the content modeller module 500 will now be described in detail. For the S pixel set 705 input to the content modeller module 500, gradients among pixel data of the S pixel set 705 are analyzed first in a gradient module 501. Gradients selected by the gradients module 501 are passed over to a flat region module 502, where any flat region is detected using the gradients. The flat region module 502, executed by the processor 605, controls a switch 503. The switch 503 passes any pixel data, of the S pixel set 705, which has been detected by the flat region module 502 as from a flat region to a run counter module 513. The run counter module 513, executed by the processor 605, processes the pixel data, in a run mode by updating a run counting accordingly for the pixels of the S pixel set 705 belonging to the detected flat region.

For any pixels (e.g., a pixel 505) which do not come from flat regions, the switch 503 passes the pixel (e.g., the pixel 505) to fixed predictor modules 506, 509 and to an adaptive correction module 512. The modules 506, 509 and 512 perform a content prediction process. The fixed predictor module 506 outputs a value representing a prediction of the value of the pixel 505 based on intermediate neighbour pixels of the pixel 505. The predicted pixel value is input into an adder node 511, where the predicted pixel value is summed with a correction value output from adaptive correction module 512. The adder node 511 outputs a corrected version of the predicted pixel value, denoted as 510. The corrected pixel value 510 is then input into a subtraction node 507. In node 507, the value of the pixel 505 is subtracted by the corrected pixel value 510 to generate a prediction residue value 508.

The predicted residue value 508 is input to a second fixed predictor module 509. The second fixed predictor module 509 predicts the distribution of the predicted residue value 508 according to the gradients 504 from the gradient module 501. The fixed predictor module 509 outputs an index of a Golomb parameter 516. The Golomb parameter 516 is input to the entropy encoding module 520 to generate compressed data.

The content modeller 500 comprises a feedback loop 515. Information from the second fixed predictor module 509 is fed back to the adaptive correction module 512. Based on the feedback information from the second fixed predictor module 509, the adaptive correction module 512 updates bias correction adaptively for further pixel data 505.

The entropy encoder module 520 takes two inputs from the content modeller module 500, namely the Golomb parameter 516 and a run counter number 519 as seen in FIG. 5. For those pixels which belong to a flat region, the run counter number 519 is output from a run counter module 513 into a run encoder module 518. The run encoder module to 518 outputs s run-length code which represents a compressed version of the pixel data, of the S pixel set 705, belonging to a flat region. For those pixels of the S pixel set 705 not belonging to a flat region, the Golomb parameter 516 output from the content modeller module 514 is input to a Golomb coder module 517. The Golomb coder module 517 generates a Golomb code according to the input Golomb parameter 516 for the pixel 505. In the entropy encoder 520, there is also a merger 521 which merges the output from the Golomb coder module 517 and the output from the run encoder module 518 together according to detection of flat region and scan order of the S pixel set 705. The merger 521 outputs a lossless compressed version (or representation) of the S pixel set 705.

Figure 10:
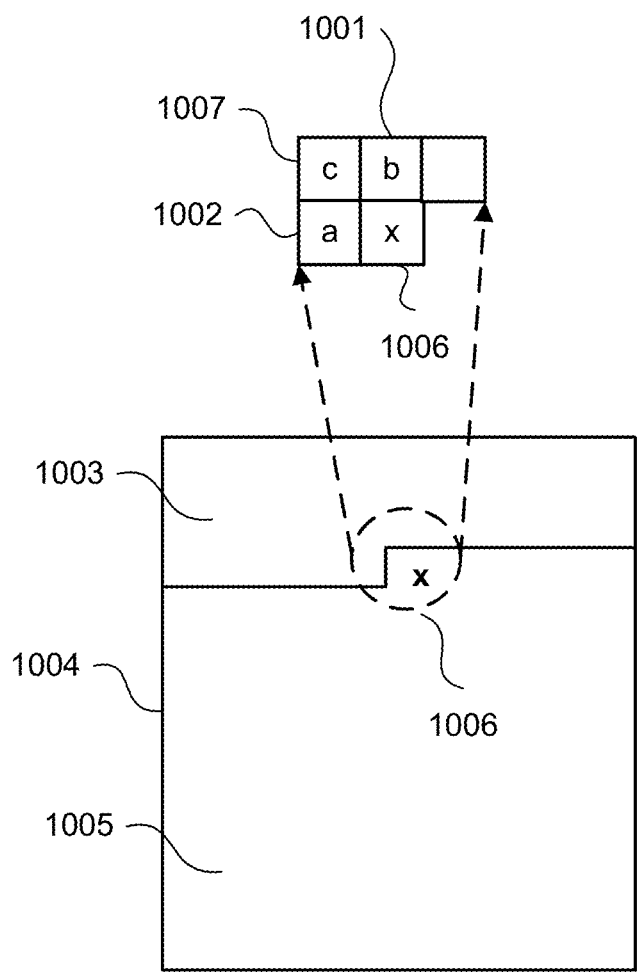
FIG. 10 shows an example neighbour content used by the fixed predictor of FIG. 5.

As seen in FIG. 10, given input pixel data 1004 (e.g., the S pixel set 705), the JPEG LS encoder module 706 separates the pixel data 1004 into two different regions, a previous processed region 1003 whose pixel data has been processed by the encoder 710, and a future processing region 1005 whose pixel data is yet to be processed by the encoder 710.

In the example of FIG. 10, position of a current pixel 1006 is highlighted by a cross mark, "x"1000. The JPEG LS encoder module 706 extracts intermediate neighbour pixels of the current pixel 1006 and predicts the pixel value of the current pixel 1006. A neighbour pixel set is shown in FIG. 10. The neighbour pixel set comprises top-left pixel 1007, denoted as c, top pixel 1001 (denoted as b), and left pixel 1002 (denoted as a), all of which are adjoined to the current pixel 1007 and have been processed previously by the JPEG LS encoder module 706. A prediction of the pixel value for the current pixel 1006 may be determined in accordance with Equation (1) as follows:

$$\hat{x} = \begin{cases} \min(a, b), & \text{if } c \geq \max(a, b) \\ \max(a, b), & \text{if } c \leq \min(a, b) \\ a + b - c, & \text{otherwise,} \end{cases} \quad (1)$$

where $\hat{x}$ denotes the predicted pixel value of the current pixel 1006, min(•) and max(•) represents a minimum and maximum operation, respectively, and a, b, c are the neighbour pixels of the current pixel 1006 as shown in FIG. 10.

Figure 11:
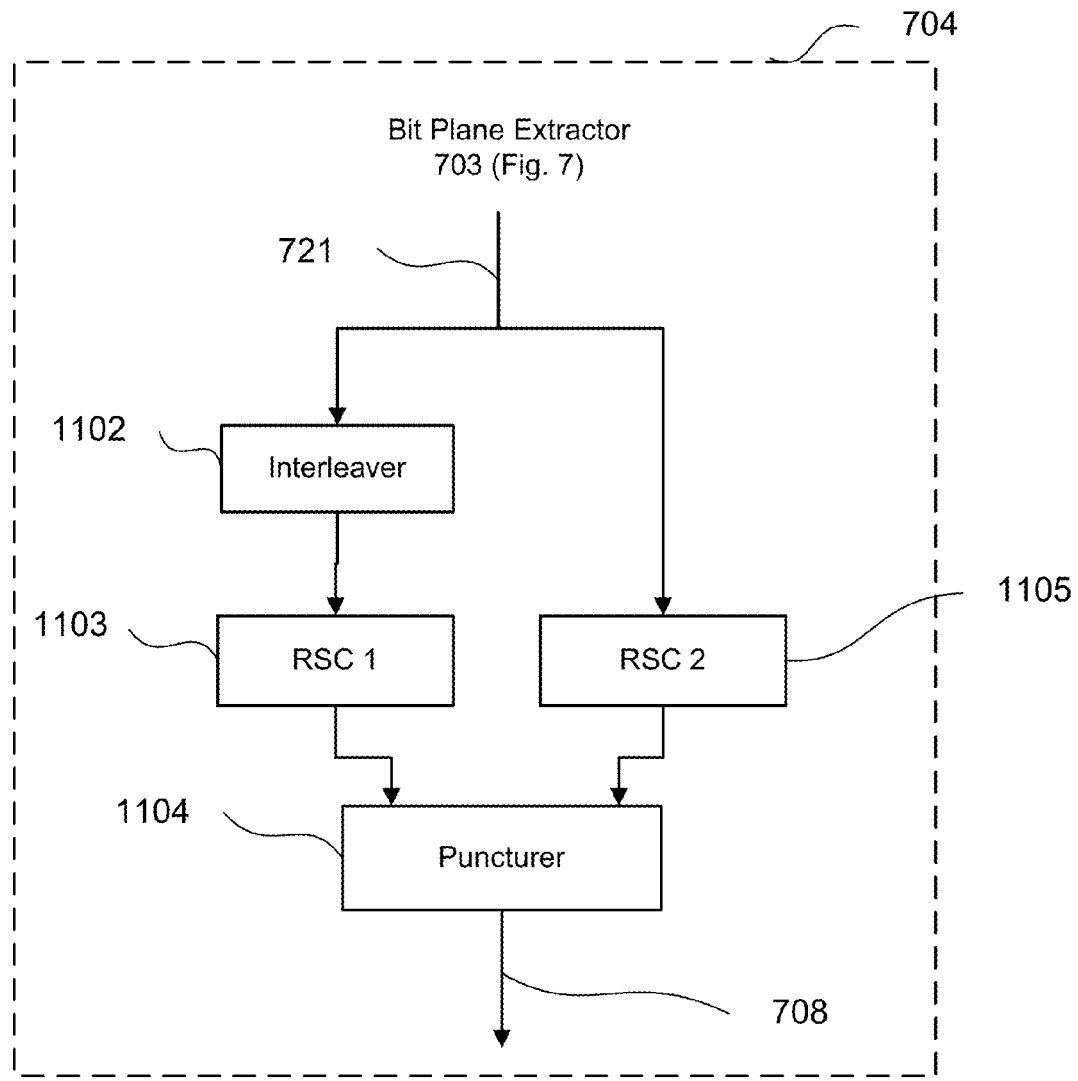
FIG. 11 shows a schematic block diagram of the turbo encoder of the system in FIG. 7.

FIG. 11 is a schematic block diagram of the turbo coder module 704. The turbo coder module 704, executed by the processor 605, encodes the bit stream 721 output from the bit plane extractor module 703 according to a bitwise error correction method. The turbo coder module 704 receives as input the bit stream 721 from the bit plane extractor 703. An interleaver module 1102 of the turbo coder module 704 interleaves the bit stream 721 (the information bit stream). In the example of FIG. 11, the interleaver module 1102 is a block interleaver. Alternatively, any other suitable interleaver may be used. For example, the interleaver module 1102 may be a random or pseudo-random interleaver, or a circular-shift interleaver.

The output from the interleaver module 1102 is an interleaved bit stream, which is passed on to a recursive systematic coder (RSC 1) module 1103. The recursive systematic coder module 1103 produces parity bits. One parity bit per input bit is produced by the recursive systematic coder module 1103. In the example of FIG. 11, the recursive systematic coder module 1103 is generated using octal generator polynomials seven (7) (binary $111_2$) and five (5) (binary $101_2$).

A second recursive systematic coder (RSC 2) module 1105, executed by the processor 605, operates directly on the bit stream 721 from the bit plane extractor module 703. In the example of FIG. 7 the recursive systematic coder modules 1103 and 1105 are substantially identical. Both recursive systematic coder modules 1103 and 1105 output a parity bit stream to a puncturer module 1140, with each parity bit stream being equal in length to the input bit stream 721.

The puncturer module 1104 deterministically deletes parity bits to reduce the parity bit overhead previously generated by the recursive systematic coder modules 1103 and 1105. "Half-rate codes" may be used by the puncturer module 1104, which means that half the parity bits from each recursive systematic encoder module 1103 and 1105 are punctured. Alternatively, the puncturer module 1104 may depend on additional information, such as the bit plane of the current information bit. In yet another alternative, the method employed by the puncturer module 1104 may depend on the spatial location of a pixel to which the information bit belongs, as well as the frequency content of the area around the pixel.

The turbo coder module 704 outputs the punctured parity bit stream 708, which comprises parity bits produced by recursive systematic coder modules 1103 and 1105.

The side information generator module 714, executed by the processor 605, performs the steps of generating an approximation (or estimation) of the original input pixel data 701 based on the lossless-reconstructed S pixel set 715 which is output from the JPEG LS decoder module 714. The pixels in the reconstructed S pixel set 715 follows the same order as that of the S pixel set 705 output from the pixel data splitter module 702 at the encoder 710.

Figures 12A, 12B:
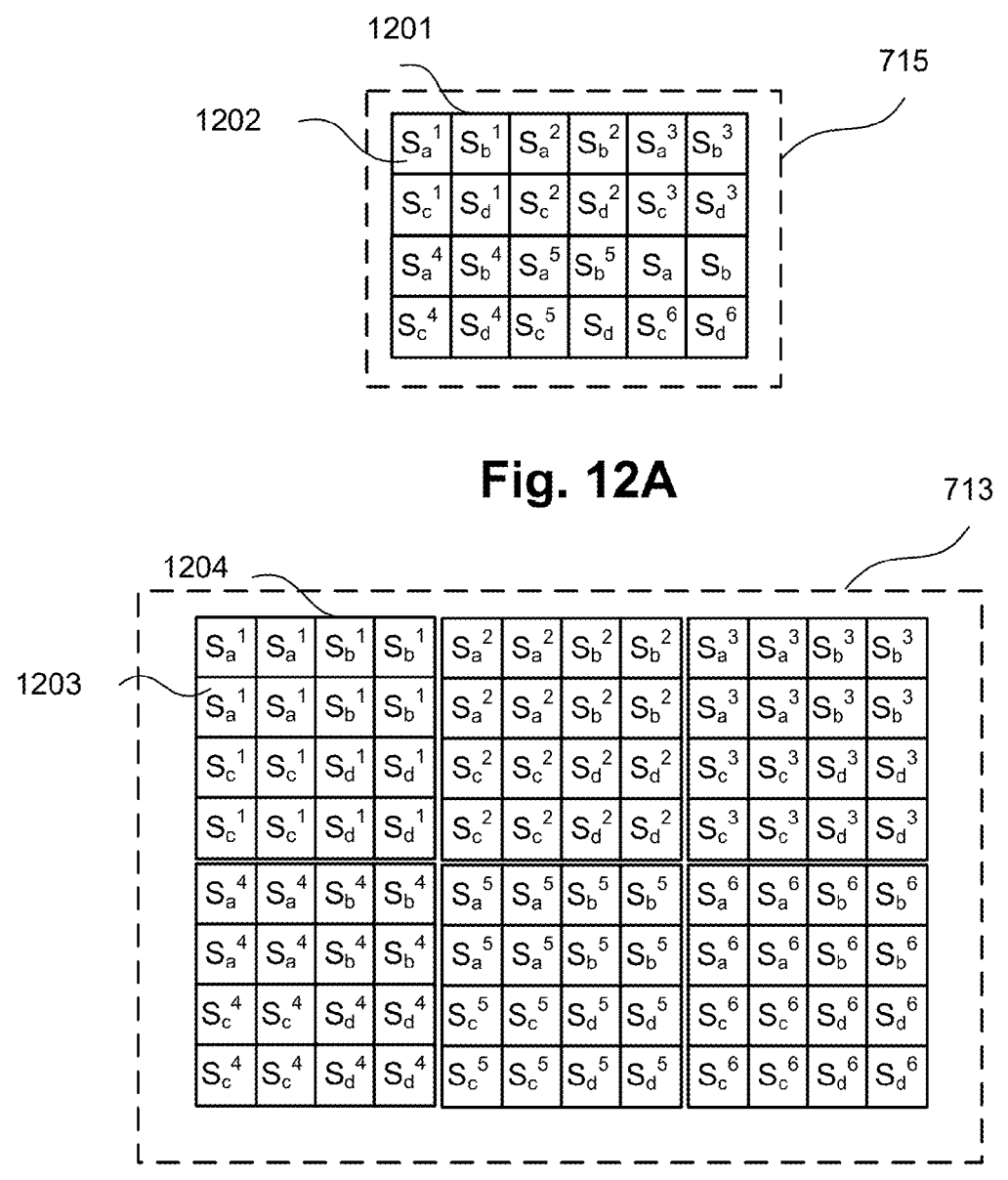

The inverse process of splitting the S pixel set 705 output from the input pixel data 701 is applied to the reconstructed S pixel set 715. Other pixels in sub-arrays are approximated using S pixels. As shown in FIG. 12B, a top-left quarter 1203 of a sub-array 1204 are filled. The top-left quarter 1203 of the sub-array 1204 is filled using a top-left S pixel value $S_a^1$ 1202 from a subset 1201 as shown in FIG. 12A. Similarly, a top-right quarter of the sub-array 1204 is filled using top-right S pixel value $S_b^1$. A bottom-left to quarter of the sub-array 1204 is filled using the bottom-left S pixel value $S_c^1$. Finally, a bottom-right quarter of the sub-array 1204 is filled using bottom-right S pixel value $S_d^1$. The side information generator module 714 processes each sub-array 714 in a similar manner in a raster-scan order.

The side information generator module 714 outputs the pixel data 713 representing the approximation (or estimation) of the input pixel data 701. As seen in FIG. 12B, the same S pixels are around a centre of each sub-array (e.g., 1204) in the output pixel data 713. The P pixels in each sub-array of the pixel data 713 are approximated by the S pixels as describe above. The output pixel data 713 of the side information generator module 714 is input to the bit plane extractor module 712 and is used for generating systematic bits for the turbo decoding module 719.

The turbo decoder module 719 is now described in detail with reference to FIG. 13, where a schematic block diagram of the turbo decoder module 719 is shown. As seen in FIG. 13, parity bits 1300 in bit stream 708 are split into two sets of parity bits 1302 and 1304. The set of parity bits 1302 originates from the recursive systematic coder module 1103 (FIG. 11) and one set of parity bits 1304 originating from the recursive systematic coder module 1105 (see FIG. 11).

The parity Bits 1300 are then input to a component decoder module (i.e., Component Decoder 1) 1306, which preferably uses a Soft Output Viterbi Decoder (SOYA) algorithm. Alternatively, a Max-Log Maximum A Posteriori Probability (MAP) algorithm may be used by the component decoder module 1306. In yet another alternative, variations of the SOYA or the MAP algorithms may be used by the component decoder module 1306.

Systematic bits 1301 from bit plane extractor module 712 are passed as input to an interleaver module 1305. The interleaver module 1305 is also linked to the component decoder module 1306. In a similar manner, parity bits 1304 are input to a component decoder module (i.e., Component Decoder 2) 1307, together with the systematic bits 1301.

Figure 13:
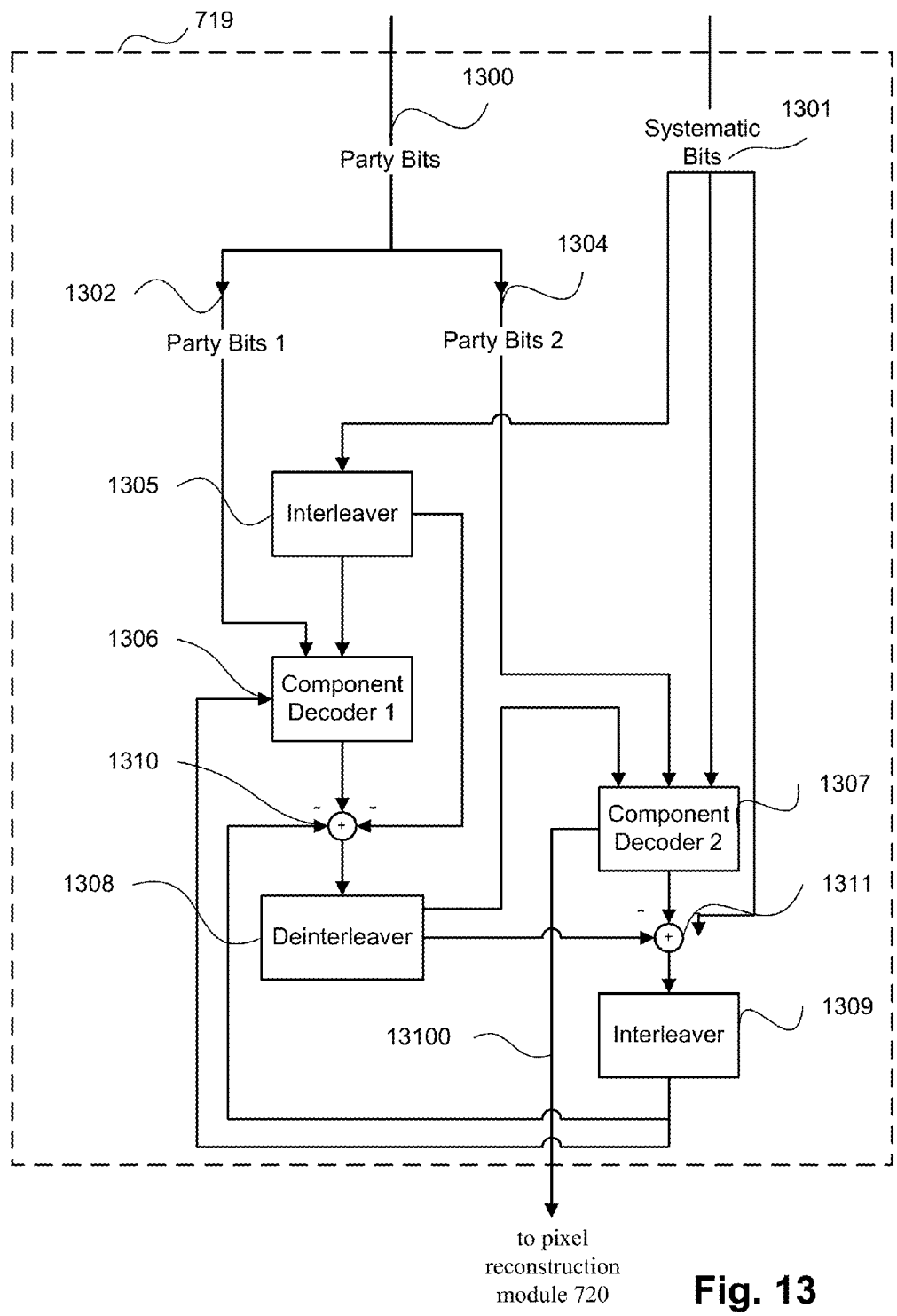
FIG. 13 shows a schematic block diagram of the turbo decoder of the system in FIG. 7.

As can be seen in FIG. 13, the turbo decoder module 719 comprises a loop formed from the component decoder module 1306, to an adder 1310, to a de-interleaver module 1308, to the component decoder module 1307, to adder 1311, to interleaver module 1309 and back to component decoder module 1306.

The component decoder module 1306 takes three inputs with the first input being the parity bits 1302. The second input of the component decoder module 1306 is the interleaved systematic bits from the interleaver module 1305. The third input to the component decoder module 1306 are the interleaved systematic bits output from the second component decoder module 1307, modified in adder 1311 and interleaved in the interleaver module 1309. The component decoder module 1307 provides information to the other component decoder module 1306. In particular, the component decoder module 1307 provides information about likely values of the bits to be decoded. The information provided by the component decoder module 1307 is typically provided in terms of Log Likelihood Ratios $$L(u_k) = \ln\left(\frac{P(u_k = +1)}{P(u_k = -1)}\right),$$

where $P(u_k=+1)$ denotes the probability that the bit $u_k$ equals +1 and where $P(u_k=-1)$ denotes the probability that the bit $u_k$ equals −1.

In the first iteration of the turbo decoder module 719, a feedback input from the second component decoder module 1307 to the first component decoder module 1306 does not exist. Therefore, in the first iteration, the feedback input from the second component decoder module 1307 is set to zero.

A decoded bit stream produced by component decoder module 1306 is passed on to adder 1310 where "a priori information" related to the decoded bit stream is produced. Systematic bits received from the interleaver module 1305 are extracted in the adder 1310. The information produced by the second component decoder module 1307, processed analogously in adder 1311 and interleaved in interleaver module 1309, are extracted by the adder 1310 as well. Left over is the a priori information which provides the likely value of a bit. The a priori information is valuable for the component decoder module 1306.

A bit stream resulting from operation of the adder 1310, is de-interleaved in the de-interleaver module 1308, which performs the inverse action of the interleaver module 1305. A de-interleaved bit stream from de-interleaver module 1308 is provided as input to component decoder module 1307. In the example of FIG. 13, the component decoder module 1307 as well as adder 1311 work analogously to component decoder module 1306 and adder 1310 as described above. A bit stream output by the adder 1311 is again interleaved in interleaver 1309 and used as input to the first component decoder module 1306 which begins a second iteration of the turbo decoder module 719.

Figure 15:
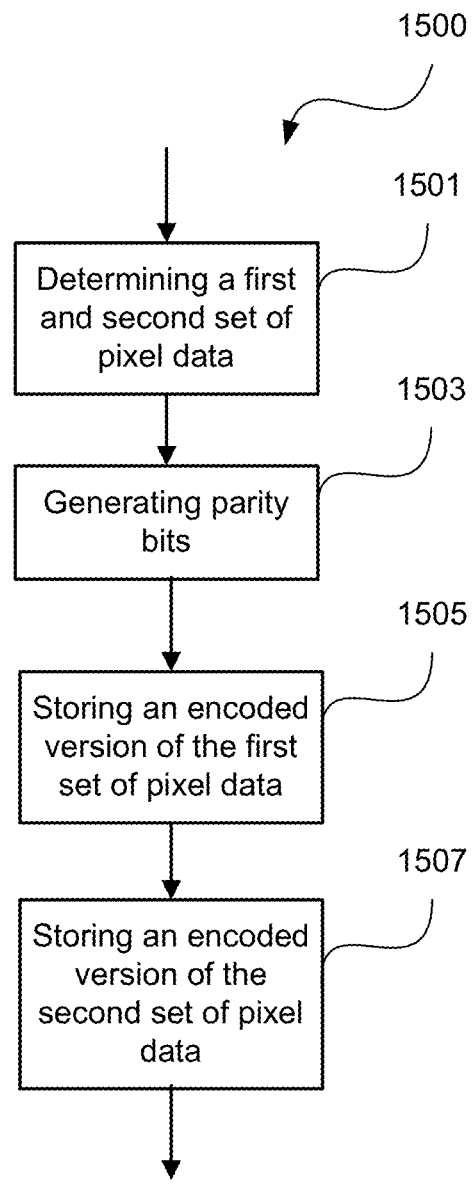
FIG. 15 is a flow diagram showing a method of storing pixel data corresponding to a pixel, using the system of FIG. 7.

FIG. 15 is a flow diagram showing a method 1500 of storing pixel data (e.g., 701) corresponding to a pixel. The method 1500 may be performed by the encoder 710. As described above, the encoder 710 may be implemented as software resident in the internal storage module 609 and being controlled in its execution by the processor 605.

The method 1500 begins at step 1501, where the encoder 710, under execution of the processor 605, performs the step of determining a first (e.g., "set P") and a second (e.g., "set S") set of pixel data for the pixel. At the next step 1503, the encoder 710 performs the step of generating parity bits for the first set of pixel data, using error correction as described above. Then at step 1505, the encoder 710 performs the step of storing, in the internal storage module 609, an encoded version (or representation) 708 of the first set of pixel data including the parity bits. The method 1500 concludes at the next step 1507, the processor 605 performs the step of storing an encoded version (or representation) 722 of the second set of pixel data, using lossless data compression (as described above), for use in decoding the first set of pixel data. Again, the encoded version 722 of the second set of pixel data may be stored in the internal storage module 609.

In the example of FIG. 7, eight iterations between the first component decoder module 1306 and the second component decoder module 1307 are carried out. After completion of eight iterations a resulting bit stream produced from component decoder module 1307 is output.

The component decoder module 1306 is now described in more detail with reference to FIG. 14.

Figure 14:
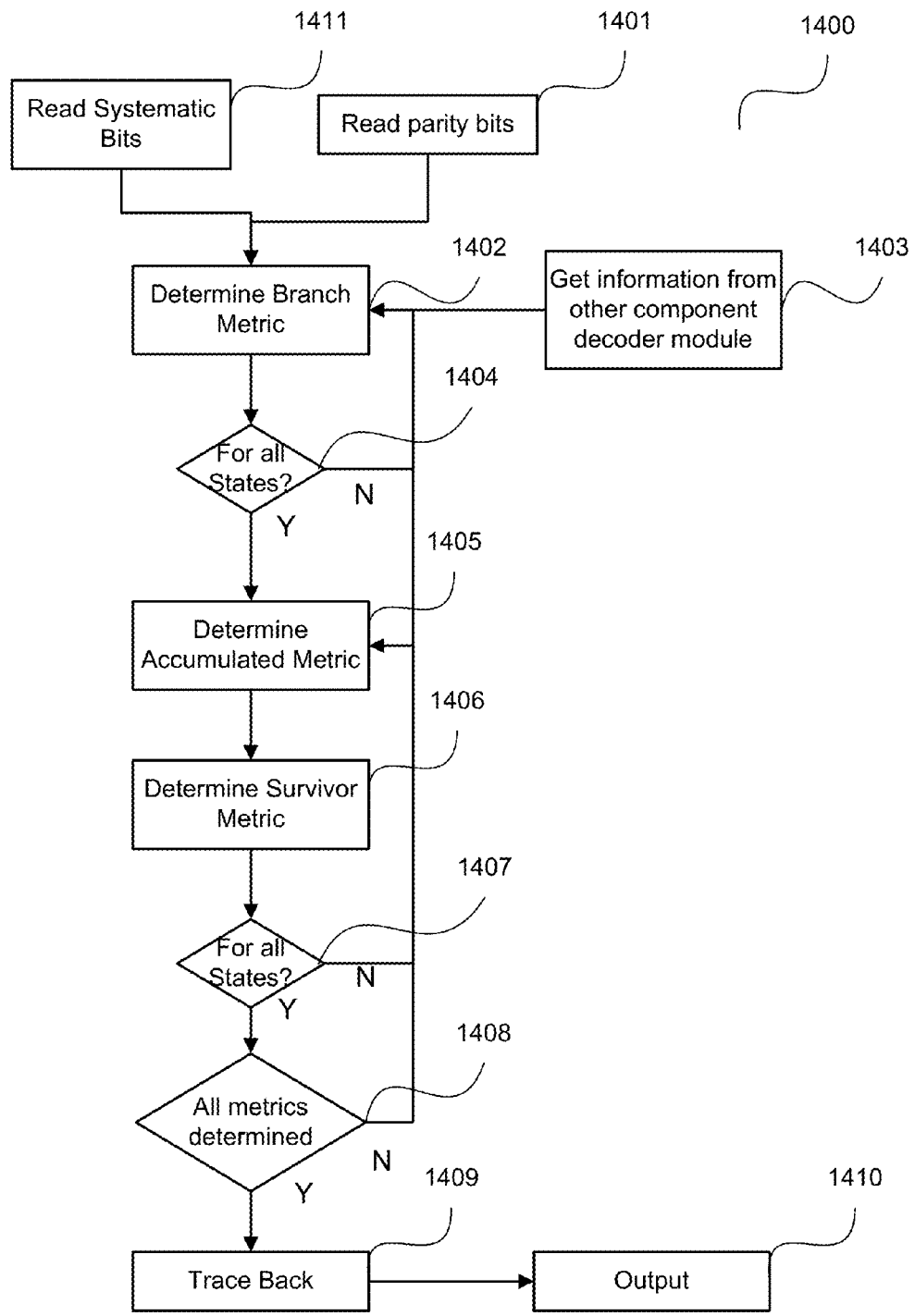
FIG. 14 shows a schematic flow diagram of a decoding method performed in the component decoder module of the turbo decoder of FIG. 13.

FIG. 14 is a schematic flow diagram of a decoding method 1400 performed by the component decoder module 1306. The component decoder module 1306 may be implemented as software resident on the internal storage module 609 and is controlled in its execution by the processor 605.

As described above, the two component decoder modules 1306 and 1307 need not be identical. However, in the example of FIG. 7, the component decoder modules 1306 and 1307 are substantially identical.

The component decoder module 1306, executed by the processor 605, commences operation at step 1411 by reading the systematic bits 1301 (see FIG. 13). As described above, the systematic bits 1301 are output by the side information generator module 714 and processed by the bit plane extractor module 712 (see FIG. 7).

At step 1401, the parity bits 1302 (see FIG. 13) are read by the component decoder module 1306. The parity bits 1302 may be read from the internal storage module 609.

The method 1400 continues in step 1402 where the processor 605 determines a "branch" metric. The branch metric is a measure of decoding quality for a current code word. The branch metric is zero if the decoding of the current code word is error free. The branch metric will be described in further detail below. Code word decoding errors can sometimes not be avoided and can still result in an overall optimal result.

At the next step 1402, the component decoder module 1306 determines the branch metric. At step 1403, the component decoder module 1306 gets information from the other component decoder module 1307 (see FIG. 13). The information is in the form of the log likelihood ratios as described above. The log likelihood ratios, and as such the branch metrics, is based on a model of the noise to be expected on the systematic bits 1301 (FIG. 3). In accordance with the example of FIG. 7, the systematic bits 1301 are extracted from the lossless-reconstructed S pixel data 715 output from the JPEG LS decoder module 711 (see FIG. 7). There is no need for error compensation in the systematic bits 1301.

Referring again to FIG. 14, at the next step 1404, the component decoder module 1306, executed by the processor 605, determines whether the branch metrics for all states of a trellis diagram corresponding to the component decoder module 1306 have been determined. If the branch metrics for all states have not been determined, then processing returns to step 1402. Otherwise, if the component decoder module 1306 determines at step 1404 that the branch metrics for all states have been determined, then the method 1400 continues to step 1405.

At step 1405, the component decoder module 1306, executed by the processor 605, determines the accumulated branch metric. The accumulated branch metric represents the sum of previous code word decoding errors, which is the sum of previous branch metrics. The accumulated branch metric may be stored in the internal storage module 609.

The method 1400 continues at the next step 1406, where the component decoder module 1306 determines "survivor path" metrics. The survivor path metric represents a lowest overall sum of previous branch metrics, indicating an optimal decoding to date.

At step 1407, the component decoder module 1306 determines whether the survivor path metrics for all states of the trellis diagram corresponding to the component decoder module 1306 have been determined. If the survivor path metrics for some states remain to be determined, then the method 1400 returns to step 1405. Otherwise, the method proceeds to step 1408.

Once the survivor path metric is determined for all nodes in the trellis diagram, the component decoder module 1306 determines a trace back at the next step 1409. In particular, at step 1409 the component decoder module 1306 uses a best one of the decoding branch metrics (i.e., indicating the decoding quality) determined in step 1402 to generate a decoded bit stream. The method 1400 concludes at the final output step 1410, where the component decoder module 1306 outputs the decoded bit-stream.

In the context of this specification, the word "comprising" means "including principally but not necessarily solely" or "having" or "including", and not "consisting only of". Variations of the word "comprising", such as "comprise" and "comprises" have correspondingly varied meanings.

The foregoing describes only some embodiments of the present invention, and modifications and/or changes can be made thereto without departing from the scope and spirit of the invention, the embodiments being illustrative and not restrictive.

The claims defining the invention are as follows:

1. A computer implemented method of storing pixel data corresponding to a pixel, said method comprising the steps of:
    determining a first and a second set of pixel data for the pixel;
    generating information for the first set of pixel data, using error correction;
    storing an encoded version of the first set of pixel data including the information; and
    storing an encoded version of said second set of pixel data, using lossless data compression, for use in decoding the first set of pixel data.

2. The method according to claim 1, further comprising the step of decoding the first set of pixel data using the second set of pixel data and the information.

3. The method according to claim 1, wherein the first set of pixel data is compressed according to content of an image represented by the second set of pixel data.

4. The method according to claim 3, further comprising the step of isolating flat regions of the image.

5. The method according to claim 1, wherein the pixel data is captured using a plurality of sensor cells.

6. The method according to claim 1, wherein parity bits are generated for each bit plane of the first set of pixel data.

7. The method according to claim 1, further including the step of generating side information for the second set of pixel data.

8. The method according to claim 1, wherein the side information is an approximation of the second set of pixel data.

9. The method according to claim 1, wherein the information is parity bits.

10. An apparatus for storing pixel data corresponding to a pixel, said apparatus comprising:
    means for determining a first and a second set of pixel data for the pixel;
    means for generating information for the first set of pixel data, using error correction;
    means for storing an encoded version of the first set of pixel data including the information; and
    means for storing an encoded version of said second set of pixel data, using lossless data compression, for use in decoding the first set of pixel data.

11. The apparatus according to claim 10, wherein the information is parity bits.

12. A system for storing pixel data corresponding to a pixel, said system comprising:
    a memory for storing data and a computer program; and
    a processor coupled to said memory executing said computer program, said computer program comprising instructions for:
    determining a first and a second set of pixel data for the pixel;
    generating information for the first set of pixel data, using error correction;
    storing an encoded version of the first set of pixel data including the information; and
    storing an encoded version of said second set of pixel data, using lossless data compression, for use in decoding the first set of pixel data.

13. The system according to claim 12, wherein the information is parity bits.

14. A non-transitory computer readable storage medium having recorded thereon a computer program for storing pixel data corresponding to a pixel, said program comprising:
    code for determining a first and a second set of pixel data for the pixel;
    code for generating information for the first set of pixel data, using error correction;
    code for storing an encoded version of the first set of pixel data including the information; and
    code for storing an encoded version of said second set of pixel data, using lossless data compression, for use in decoding the first set of pixel data.

15. The computer readable medium according to claim 14, wherein the information is parity bits.

16. A computer implemented method of decoding pixel data corresponding to a pixel, said method comprising the steps of:
    determining a first and a second set of pixel data for the pixel;
    generating information for the first set of pixel data, using error correction;
    storing an encoded version of the first set of pixel data including the information;
    storing an encoded version of said second set of pixel data, using lossless data compression, for use in decoding the first set of pixel data; and
    decoding the first set of pixel data using the second set of pixel data and the information.

17. The method according to claim 16, wherein the first set of pixel data is compressed according to content of an image represented by the second set of pixel data.

18. The method according to claim 17, further comprising the step of isolating flat regions of the image.

19. The method according to claim 16, wherein the pixel data is captured using a plurality of sensor cells.

20. The method according to claim 16, wherein parity bits are generated for each bit plane of the first set of pixel data.

21. An apparatus for decoding pixel data corresponding to a pixel, said apparatus comprising:
- means for determining a first and a second set of pixel data for the pixel;
- means for generating information for the first set of pixel data, using error correction;
- means for storing an encoded version of the first set of pixel data including the information;
- means for storing an encoded version of said second set of pixel data, using lossless data compression, for use in decoding the first set of pixel data; and
- means for decoding the first set of pixel data using the second set of pixel data and the information.

22. An apparatus for decoding pixel data corresponding to a pixel, said apparatus comprising:
- a memory for storing data and a computer program; and
- a processor coupled to said memory executing said computer program, said computer program comprising instructions for:
- determining a first and a second set of pixel data for the pixel;
- generating information for the first set of pixel data, using error correction;
- storing an encoded version of the first set of pixel data including the information;
- storing an encoded version of said second set of pixel data, using lossless data compression, for use in decoding the first set of pixel data; and
- decoding the first set of pixel data using the second set of pixel data and the information.

23. A non-transitory computer readable storage medium having recorded thereon a computer program for decoding pixel data corresponding to a pixel, said program comprising:
- code for determining a first and a second set of pixel data for the pixel;
- code for generating information for the first set of pixel data, using error correction;
- code for storing an encoded version of the first set of pixel data including the information;
- code for storing an encoded version of said second set of pixel data, using lossless data compression, for use in decoding the first set of pixel data; and
- code for decoding the first set of pixel data using the second set of pixel data and the information.

24. A method of storing pixel values for a portion of an image captured using a plurality of sensor cells in a sensor cell array, the plurality of sensor cells being associated with at least one micro lens in a micro lens array and arranged to form a sensor cell sub-array to capture a single pixel value associated with an output image, the method comprising the steps of:
- storing lossless bits as a lossless representation of pixels values from a first subset of the plurality of sensor cells;
- generating information for pixel values from a second subset of the plurality of sensor cells, wherein the second subset of sensor cells is unique to the first subset of sensor cells; and
- storing the generated information for use during decoding with the lossless bits to generate an estimation of the pixel value associated with the output image.

* * * * *